US012688403B2

(12) United States Patent
Singh et al.

(10) Patent No.: US 12,688,403 B2
(45) Date of Patent: Jul. 21, 2026

(54) GENERATIVE ARTIFICIAL INTELLIGENCE (AI) SYSTEM

(71) Applicant: Microsoft Technology Licensing, LLC, Redmond, WA (US)

(72) Inventors: Nitant Singh, Sammamish, WA (US); Deepankar Shreegyan Dubey, Redmond, WA (US); Stephen Michael Kofsky, Seattle, WA (US); Qiang Du, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 699 days.

(21) Appl. No.: 18/178,234

(22) Filed: Mar. 3, 2023

(65) Prior Publication Data
US 2024/0296314 A1 Sep. 5, 2024

(51) Int. Cl.
G06N 3/0475 (2023.01)

(52) U.S. Cl.
CPC ................................. G06N 3/0475 (2023.01)

(58) Field of Classification Search
CPC ........ G06N 3/04; G06N 3/045; G06N 3/0475; G06N 3/06; G06N 3/08; G06N 3/082; G06N 3/096; G06N 3/098; G06N 3/10; G06N 20/00; G06N 20/10; G06N 20/20; G06F 16/2471
See application file for complete search history.

(56) References Cited

U.S. PATENT DOCUMENTS

| | | | |
|---|---|---|---|
| 11,995,180 | B1 | 5/2024 | Cappel |
| 2011/0047176 | A1 | 2/2011 | Hoffman |
| 2018/0004948 | A1 | 1/2018 | Martin et al. |
| 2019/0156247 | A1 | 5/2019 | Faulhaber et al. |
| 2020/0192904 | A1 | 6/2020 | Safronov |

(Continued)

FOREIGN PATENT DOCUMENTS

KR 20210125911 A 10/2021

OTHER PUBLICATIONS

International Search Report and Written Opinion received for PCT Application No. PCT/US2024/017778, Jun. 5, 2024, 12 pages.

(Continued)

*Primary Examiner* — Shane D Woolwine
(74) *Attorney, Agent, or Firm* — Schwegman Lundberg & Woessner, P.A.

(57) ABSTRACT

A generative artificial intelligence (AI) model application programming interface (API) receives a generative AI request and routes the generative AI request to a generative AI model. The generative AI model API identifies whether the generative AI request is an asynchronous or a synchronous request and identifies a likely length of generation requested by the generative AI request. The generative AI model API evaluates the available capacity of generative AI models in a shared pool of computing system resources based upon the generative AI model type requested by the generative AI request and based upon the length of the requested generation. The generative AI model API routes the generative AI request to a generative AI model based upon the available capacity, whether the generative AI request is synchronous or asynchronous, the generative AI model type, and the length of the requested generation.

20 Claims, 15 Drawing Sheets

(56)                References Cited

U.S. PATENT DOCUMENTS

| | | | |
|---|---|---|---|
| 2021/0081819 A1 | 3/2021 | Polleri | |
| 2021/0312129 A1* | 10/2021 | Srinivasan | G06F 40/258 |
| 2022/0076145 A1* | 3/2022 | Yalla | G06N 20/00 |
| 2022/0083389 A1 | 3/2022 | Poothia | |
| 2022/0138267 A1* | 5/2022 | Otsuka | G06N 3/044 |
| | | | 704/9 |
| 2022/0239758 A1 | 7/2022 | Klein | |
| 2022/0382539 A1* | 12/2022 | Gumashta | G06N 20/00 |
| 2023/0083913 A1* | 3/2023 | Allouche | G06N 10/80 |
| | | | 709/220 |
| 2023/0112921 A1 | 4/2023 | Cai | |
| 2023/0196199 A1* | 6/2023 | Stefani | G06F 16/90335 |
| | | | 706/14 |
| 2023/0273833 A1* | 8/2023 | Jin | G06F 9/5055 |
| | | | 718/104 |
| 2023/0315722 A1 | 10/2023 | Saxe | |
| 2023/0334045 A1* | 10/2023 | Bergman | G06F 16/906 |
| 2024/0054546 A1 | 2/2024 | Gobran | |
| 2024/0202458 A1 | 6/2024 | Zha | |
| 2024/0296315 A1 | 9/2024 | Singh | |
| 2024/0296316 A1 | 9/2024 | Singh | |

OTHER PUBLICATIONS

Dang, et al., "How to Prompt? Opportunities and Challenges of Zero- and Few-Shot Learning for Human-AI Interaction in Creative Applications of Generative Models", arxiv.org, Cornell University Library, 201 Olin Library Cornell University Ithaca, NY 14853, Sep. 3, 2022, pages.

International Search Report and Written Opinion received for PCT Application No. PCT/US2024/017581, Jul. 2, 2024, 14 pages.
International Search Report and Written Opinion received for PCT Application No. PCT/US2024/017777, Jun. 4, 2024, 17 pages.
Sungpil Shin, "Draft Recommendation ITU-T Y.MLaaS-reqts Cloud computing-functional requirements for machine learning as a service", International Telecommunication Union, Retrieved from the Internet: URL: https://www.itu.int/ifa/t/2017/sg13/exchange/wp2/q17/202007/Drafting/Y.MLaaS-reqts/OutputDraft/Output Draft Y.MLaaS-reqtsrl-Kangchan.docx, Jul. 24, 2020, pp. 1-54.
Wu, et al., "AI Chains: Transparent and Controllable Human-AI Interaction by Chaining Large Language Model Prompts", Proceedings of the 2022 CHI Conference on Human Factors in Computing Systems, Apr. 29, 2022, pp. 1-22.
Wu, et al., "PromptChainer: Chaining Large Language Model Prompts through Visual Programming", CHI Conference on human factors in computing systems extended abstracts, Apr. 27, 2022, pp. 1-10.
International Preliminary Report on Patentability (Chapter I) received for PCT Application No. PCT/US2024/017581 mailed on Sep. 18, 2025, 8 Pages.
International Preliminary Report on Patentability (Chapter I) received for PCT Application No. PCT/US2024/017777, mailed on Sep. 18, 2025.
International Preliminary Report on Patentability (Chapter I) received for PCT Application No. PCT/US2024/017778, mailed on Sep. 18, 2025, 07 pages.
Non-Final Office Action mailed Mar. 19, 2026, in U.S. Appl. No. 18/178,255, 38 pages.
Non-Final Office Action mailed on Mar. 24, 2026, in U.S. Appl. No. 18/178,263, 31 pages.

* cited by examiner

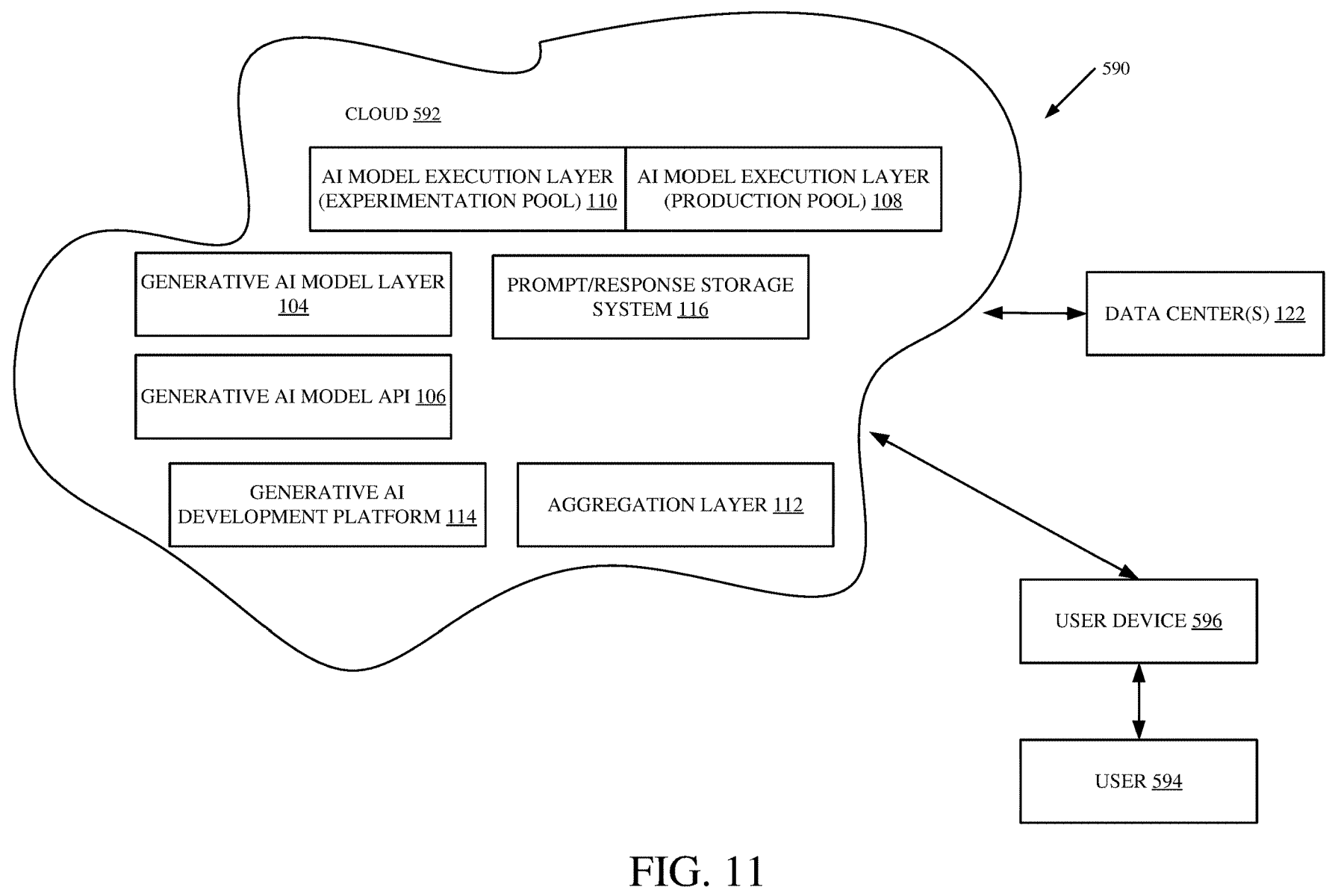

590

CLOUD 592

AI MODEL EXECUTION LAYER (EXPERIMENTATION POOL) 110 | AI MODEL EXECUTION LAYER (PRODUCTION POOL) 108

PROMPT/RESPONSE STORAGE SYSTEM 116

GENERATIVE AI MODEL LAYER 104

GENERATIVE AI MODEL API 106

AGGREGATION LAYER 112

GENERATIVE AI DEVELOPMENT PLATFORM 114

DATA CENTER(S) 122

USER DEVICE 596

USER 594

FIG. 11

GENERATIVE ARTIFICIAL INTELLIGENCE (AI) SYSTEM

BACKGROUND

Computing systems are currently in wide use. Some systems host services and applications. Such systems also provide access to generative artificial intelligence (AI) models. There are a variety of different types of generative AI models, and they include large language models (or generative pre-trained transformers—GPTs).

Large language models receive a request or prompt and generate an output based on the request or prompt. The operation of generating the output can take a variety of different forms. For instance, when the generative AI model is deployed as part of a chatbot, then the generated output is an interactive output that responds to a user chat input. Similarly, the generative AI model may be deployed in a multi-modal fashion, such as where a user asks the generative AI model to generate an image based upon a textual input. The generative AI model may be deployed in other systems as well.

The discussion above is merely provided for general background information and is not intended to be used as an aid in determining the scope of the claimed subject matter.

SUMMARY

A generative artificial intelligence (AI) model application programming interface (API) receives a generative AI request and routes the generative AI request to a generative AI model. The generative AI model API identifies whether the generative AI request is an asynchronous or a synchronous request and identifies a likely length of generation requested by the generative AI request. The generative AI model API evaluates the available capacity of generative AI models in a shared pool of computing system resources based upon the generative AI model type requested by the generative AI request and based upon the length of the requested generation. The generative AI model API routes the generative AI request to a generative AI model based upon the available capacity, whether the generative AI request is synchronous or asynchronous, the generative AI model type, and the length of the requested generation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 11 is a block diagram showing one example of the architecture illustrated in FIG. 1, deployed in a remote server environment.

DETAILED DESCRIPTION

Figure 1:
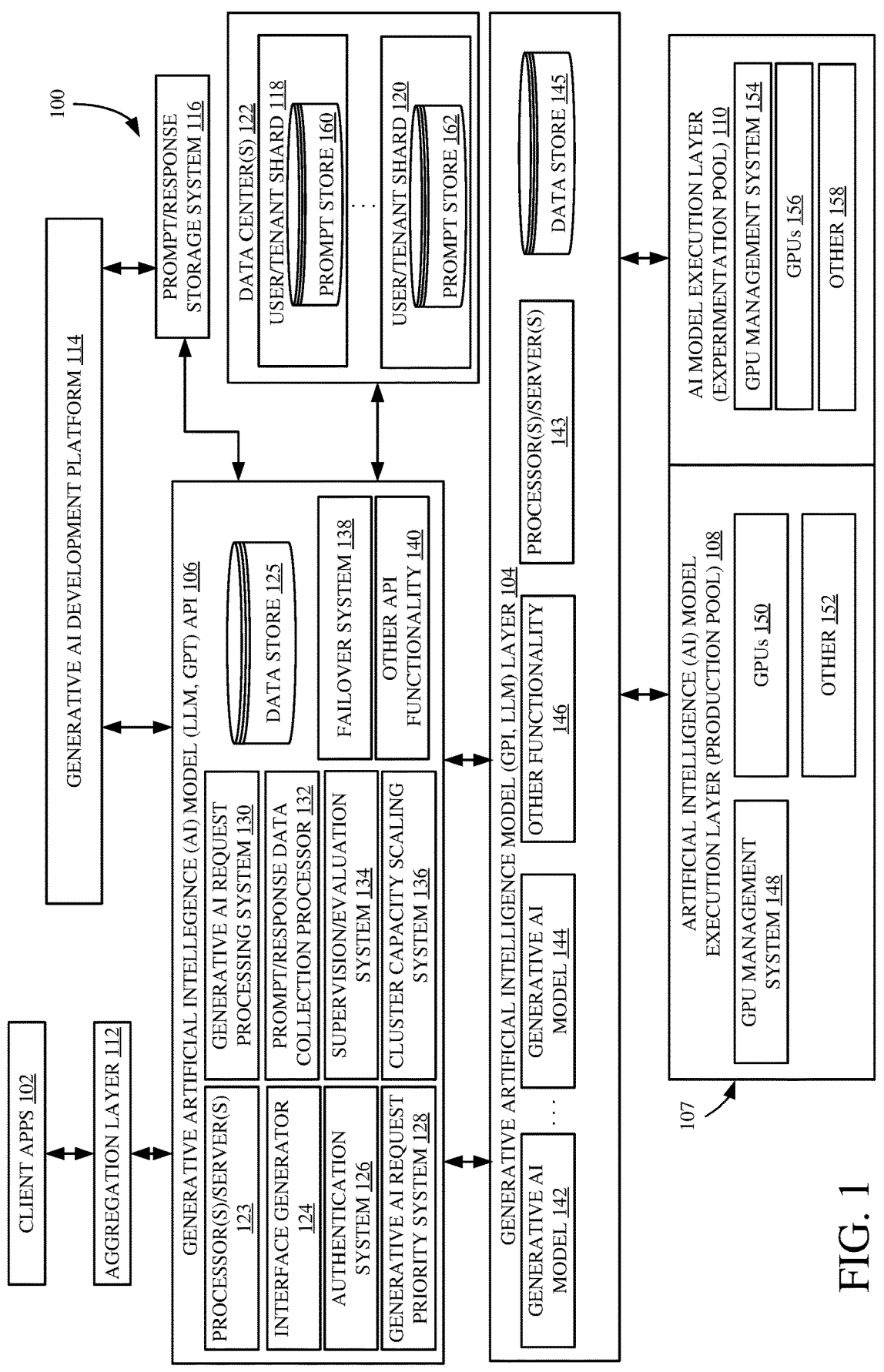
FIG. 1 is a block diagram showing one example of a generative AI model platform architecture.

As discussed above, generative artificial intelligence models (generative AI models) often take the form of large language models. Users can be given access to large language models to use generative AI on the canvas or user interfaces displayed by an application. It can be difficult to provide access to a plurality of different types of generative AI models across a plurality of different applications. Therefore, the present discussion proceeds with respect to an application programming interface (API) that supports interaction with generative AI models from a plurality of different clients, tenants, or user applications or other systems (sometimes referred to as scenarios). This greatly enhances the speed with which an application can access a plurality of different kinds of generative AI models, and reduces the complexity of the application needed to access the generative AI models.

Often, each type of generative AI model has a dedicated set of graphic processing unit (GPU) resources allocated to it. Thus, it can be difficult to perform generative AI request routing and to manage the volume of calls directed to the different generative AI model capacities. The present discussion thus proceeds with respect to a system that can perform scaling of a pool of GPU resources among a plurality of different types of generative AI models, and can route generative AI requests to a target generative AI model (or model cluster) based upon the available capacity for that type of generative AI model.

Further, the process of generating an output is more computationally expensive than the process of analyzing an input. Therefore, generative AI requests that request a large generation (generative AI model output) take more computer processing power than do generative AI requests that request a relatively small generative output.

By way of example, a generative AI request that requests the generative AI model to generate a document based upon a one-sentence input takes a relatively large amount of computer processing overhead and time. Even though processing the input can be done relatively quickly, the requested generation is large and thus responding to the generative AI request will take a relatively large amount of computer processing resources and will be a relatively long latency operation. On the other hand, a generative AI request that requests a generative AI model to provide a relatively short summary for a long document will use less computer processing resources, because the processing of the input (the large document) can be done quickly, using relatively few computer processing resources and the generation (the summary) is also likely to be relatively short, thus using relatively few computer processing resources as well.

The present discussion thus proceeds with respect to a system that routes the generative AI request based upon the anticipated length of the generation requested. For a generative AI request that requests a longer generation, the request can be routed to a longer latency generative AI model, or a generative AI model that has more available capacity. For a generative AI request that requests a relatively short generation, the generative AI request can be routed to a generative AI model that has less available capacity. These are just examples. This increases the efficiency of use of the computer processing resources and reduces the latency in processing generative AI requests. Other routing can be done as well.

Further, it can be difficult to serve both interactive (synchronous) generative AI requests (such as those used by a chatbot) and asynchronous generative AI requests (such as those used by a summarization system). The present discussion thus proceeds with respect to a request priority system that maintains a separate priority queue for synchronous generative AI requests and for asynchronous generative AI requests. This increases the proper allocation of computing system resources to the responses. The API in the present discussion also provides dynamically adjustable rate limiting, evaluation of prompts, performance metric generation, as well as failover support.

Also, it can be difficult to perform development, experimentation, and evaluation to provide generative AI request functionality in an application. The present discussion thus proceeds with respect to a generative AI model experimentation, evaluation, and development platform (the generative AI development platform) which allows a developer to have access to the different types of generative AI models in an experimentation pool so that user data can be used in a compliant manner, during experimentation, evaluation, and development of a generative AI system. The generative AI development platform includes a prompt generation system that allows the developer to develop and tune prompts by accessing prompts from a prompt store to identify relevant prompts and populate them into a prompt generation system for user interaction. The generative AI development platform includes a data extraction system that allows the developer to easily develop scripts to extract context and augmented data and to extract such data, in a compliant manner, that can be operated on by the generative AI models. The generative AI development platform also provides a prompt/response evaluation system that can be used to configure a generative AI model to evaluate the performance of the prompts and the generative AI models being used by the developer. That prompt/response evaluation system can also surface an analysis interface that allows the developer to manually analyze the performance of the prompts and generative AI models being used. The generative AI development platform also includes functionality for capturing prompts and responses so that they can be stored in a prompt library and in a prompt data store that can be implemented in separate tenant/user memory shards to ensure compliance.

Also, it can be very useful in developing generative AI systems to reuse prompts. Some current prompt storage solutions are manually populated and do not indicate how well the stored prompts perform. Further, such solutions do not support any type of compliant sharing or reuse of prompts or responses because the responses can contain customer data. The present system thus proceeds with respect to a prompt/response storage system or platform that stores prompts and responses in tenant/user memory shards to ensure compliance and that also stores evaluation data indicative of the performance of the prompts. Because the prompts and responses are stored in the tenant/user memory, the prompts and responses can also be personalized to the user or tenant based on other user/tenant data. The prompts and responses are automatically captured and populated into the prompt/response storage system and the prompt/response storage system can also be used to populate prompt libraries in the generative AI development platform. When prompts are shared outside the user or tenant data shard (for example in the prompt libraries), the response data can be removed so that no customer data is shared.

FIG. 1 is a block diagram of one example of a generative AI platform architecture 100. Architecture 100 shows that one or more client applications 102 can have access to generative artificial intelligence (AI) models in a generative AI model layer 104 through a generative AI model API 106. The generative AI models in layer 104 can be run in AI model execution layer 107 which can include a production pool 108 and an experimentation pool 110 of computing system resources. An aggregation layer 112 can aggregate generative AI requests from the different client applications 102, and provide them to API 106 so they can be processed in batches or in other ways.

Architecture 100 illustrated in FIG. 1 also shows a generative AI model experimentation, evaluation, and development platform (generative AI development platform) 114 which can be used by a developer to develop prompts and other mechanisms for accessing the generative AI models in layer 104. Prompt/response storage system 116 can be used to store prompts and responses in user/tenant data shards 118-120 in data centers 122.

Therefore, in overall operation, generative AI systems can be developed using generative AI development platform 114 in a development environment. Platform 114 can access the generative AI models in layer 104 through API 106. In a production environment, client applications 102 can make generative AI requests which are aggregated by aggregation layer 112 and provided to API 106. API 106 accesses generative AI models in layer 104 with the requests and provides responses to those requests from the generative AI models back to the requesting client applications 102. Before describing the operation of the individual pieces of architecture 100 in more detail, a description of some of the items in architecture 100, and their operation, will first be provided.

In the example shown in FIG. 1, generative AI model API 106 includes one or more processors or servers 123, data store 125, interface generator 124, authentication system 126, generative AI request priority system 128, generative AI request processing system 130, prompt/response data collection processor 132, supervision/evaluation system 134, cluster capacity scaling system 136, failover system 138, and API 106 can include a wide variety of other API functionality 140.

Generative AI model layer 104 includes one or more processors or servers 143, data store 145, a plurality of different types of generative AI models 142-144, as well as other functionality 146. AI model execution layer 107 has a production pool 108, which includes graphics processing unit (GPU) management system 148, a plurality of GPUs 150, and other functionality 152. AI model execution layer 106 also includes experimentation pool 110 that itself, includes a GPU management system 154, a set of GPUs 156, and other items 158.

API 106 can expose an interface that can be called by client applications 102 (either directly or through aggregation layer 112) to access the functionality in API 106 to submit generative AI requests to generative AI models 142-144. Authentication system 126 can authenticate the client applications, or users, using token-based authorization and authentication or using other credentials or other systems. Generative AI request priority system 128 (which is described in greater detail below) determines a priority for the received generative AI requests and enters the requests in one or more priority queues. Generative AI request processing system 130 accesses the generative AI requests based upon their order in the priority queues and processes those requests. In processing the requests, system 130 identifies the type of generative AI model being requested, and processes the prompt to route the request to a target generative AI model 142-144. Generative AI request processing system 130 also returns the responses from the target generative AI model back to the requesting client apps 102 (e.g., through the interface generated by interface generator 124 or in other ways). Prompt/response data collection processor 132 collects data corresponding to the prompt and the response generated by the generative AI model and provides that information to prompt/response storage system 116 which can store the information so that the prompt can be reused, tuned, or otherwise processed. The prompt and response can be stored in one or more prompt stores 160-162 in user/tenant memory shards 118-120 in data centers 122. The prompts and responses can also be stored for evaluation in generative AI development platform 114.

Supervision/evaluation system 134 evaluates the performance of the prompts and generative AI models using any of a wide variety of evaluation techniques or metrics. Based upon the performance, and based upon other criteria, cluster capacity scaling system 136 can provide an output to GPU management system 148 and/or GPU management system 154 to scale the number of (capacity of) GPUs in the production pool 108 and/or the experimentation pool 110. Failover system 138 can perform failover processing, such as when a generative AI model layer 104 fails, when the execution layer 106 fails, or for other reasons.

Similarly, a developer using generative AI development platform 114 is illustratively given access to all of the different types of generative AI models 142-144 by calling API 106. The generative AI requests received from platform 114 are directed to the experimentation pool 110 so that experimentation, development, and evaluation can be performed on data in a compliant way, while still using the same types of generative AI models that will be used in the production environment. Generative AI development platform 114 may have different canvasses or user experiences that give the user or developer access to different levels of functionality in platform 114, some of which is discussed elsewhere herein.

Figure 2:
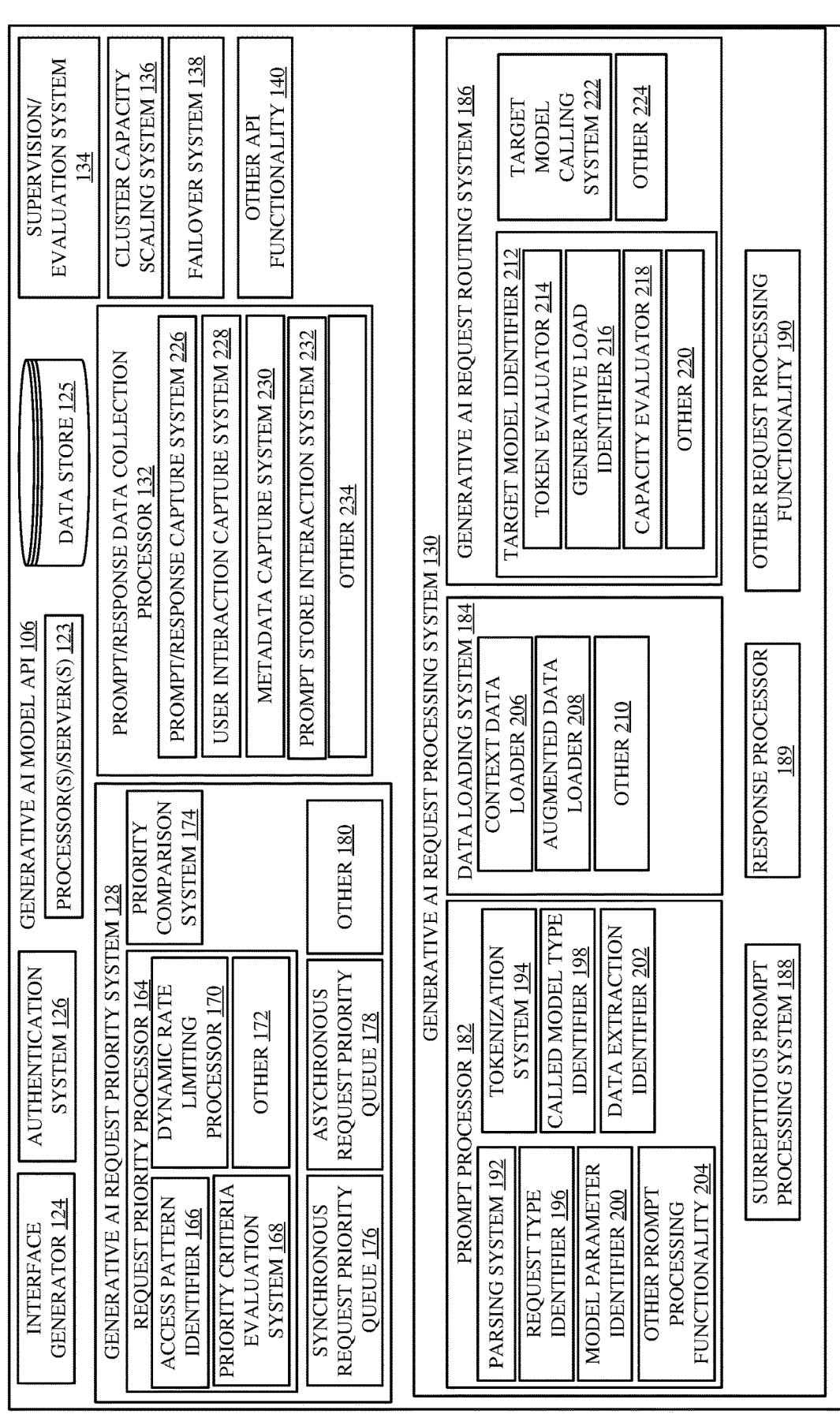
FIG. 2 is a block diagram showing one example of a generative AI model API.

FIG. 2 is a block diagram showing one example of generative AI model API 106 in more detail. Some of the items shown in FIG. 2 are similar to those shown in FIG. 1, and they are similarly numbered. In the example shown in FIG. 2, generative AI request priority system 128 includes request priority processor 164 (which, itself, includes access pattern identifier 166, priority criteria evaluation system 168, dynamic rate limiting processor 170, and other items 172), priority comparison system 174, synchronous request priority queue 176, asynchronous request priority queue 178, and other items 180. FIG. 2 also shows that generative AI request processing system 130 can include prompt processor 182, data loading system 184, generative AI request routing system 186, surreptitious prompt processing system 188, response processor 189, and other request processing functionality 190. Prompt processor 182 can include parsing system 192, tokenization system 194, request type identifier 196, called model identifier 198, model parameter identifier 200, data extraction identifier 202, and other prompt processing functionality 204. Data loading system 184 can include context data loader 206, augmented data loader 208, and other items 210. Generative AI request routing system 286 can include target model identifier 212 (which, itself, can include token evaluator 214, generative load identifier 216, capacity evaluator 218, and other items 220). Generative AI request routing system 186 can also include target model calling system 222 and other items 224.

FIG. 2 also shows that prompt/response data collection processor 132 can include prompt/response capture system 226, user interaction capture system 228, metadata capture system 230, prompt store interaction system 232, and other items 234. The operation of some of the items shown in FIG. 2 will now be described, for the sake of example.

Request priority processor 164 identifies and assigns a priority to the generative AI requests that is received through the interface generated by interface generator 124. Access pattern identifier 166 identifies the access pattern corresponding to each request (such as whether it is a synchronous request or an asynchronous request). Synchronous requests are queued in synchronous request priority queue 176, based upon their assigned priority. Asynchronous requests are queued in asynchronous request priority queue 178 based upon their assigned priority.

Priority criteria evaluation system 168 evaluates a set of priority criteria in order to assign a priority to each generative AI request so that the requests can be placed at the proper location within the appropriate queue 176 or 178. For instance, it may be that certain users, tenants, applications, or scenarios have different priorities assigned to them. Thus, priority criteria evaluation system 168 can consider the particular user, tenant, application, and/or scenario in assigning a priority. Other priority criteria can be evaluated as well.

Also, dynamic rate limiting processor 170 can dynamically set thresholds or other limits for the different users, tenants, applications, and/or scenarios in order to inhibit one of them from hoarding computing system overhead. By way of example, the dynamic rate limiting processor 170 may set thresholds based upon the time of day (such as whether it is during a time of day when there is normally heavy usage or light usage) and then compare the number of generative AI requests received from a particular user, tenant, application, or scenario to the rate limiting threshold assigned to them to determine whether throttling is appropriate. If throttling or rate limiting is to be performed, then the generative AI request may be assigned a lower priority than it would otherwise be assigned. If throttling or rate limiting is not to be performed, then the generative AI request may be a assigned the priority output by the priority criteria evaluation system 168. Based upon the priority assigned to a particular generative AI request, priority comparison system 174 compares that priority to the priority of the other entries in the appropriate priority queue 176 or 178 to identify the location in that queue where this particular generative AI request should be entered. System 174 then generates an entry in the appropriate priority queue 176 or 178 for this particular generative AI request.

Generative AI request processing system 130 accesses the generative AI request that is at the top of the particular priority queue 176 or 178 being serviced by system 130 and processes that request. Prompt processor 182 accesses the prompt in the request. Data loading system 184 loads any data (context data or augmented data) that will be used by the generative AI model. Augmented data is data that is to be operated on by the generative AI model responding to the prompt. For instance, if the generative AI request is: "Summarize all the emails I have received today." then the augmented data may be the content of all of today's emails, as just one example. Surreptitious prompt processing system 188 determines whether the prompt is a surreptitious prompt, and generative AI request routing system 186 identifies a target generative AI model (or model cluster) to service the request and routes the generative AI request (the prompt, the extracted data, etc.) to the target generative AI model. Response processor 189 receives a response from the target generative AI model and passes that response back through the interface generated by interface generator 124 to the requesting user, client application, tenant, and/or scenario.

In processing the prompt in the generative AI request, parsing system 192 parses the request into individual parts (such as words in the request, data extraction scripts, model parameters, etc.). Tokenization system 194 generates tokens based upon the parsed words in the request. Tokenization system 194 (or parsing system 192 or another item) can also identify chained prompts or calls that are to be made to service the request. For example, if the generative request is to "identify all emails I received this month that have an angry tone, and summarize those emails." this may mean that one or more generative AI models will be called or the same generative AI model may be called twice or more—once to identify angry emails and once to summarize those emails. This is just one example.

Request type identifier 196 identifies the type of generation being requested (e.g., summarization, text generation, question answering, etc.). Called model identifier 198 identifies the type of generative AI model that is being called to service the request and model parameter identifier 200 identifies the operational model parameters that are provided with the generative AI request. Such operational parameters (as opposed to the model input parameters—such as the tokens, etc.) control how the model operates and may include a temperature parameter, a top P parameter, among others. Data extraction identifier 202 identifies data extraction scripts that are provided along with the prompt and that can be run in order to extract context data or other augmented data that will be used by the target generative AI model. Context data loader 206 extracts context data using the data extraction script, and augmented data loader 208 extracts augmented data using the data extraction script.

Surreptitious prompt processing system 188 can use the processed prompt to determine whether the prompt is nefarious or surreptitious (such as being used to execute a prompt injection attack in which the prompt is attempting to make the generative AI model act in an unintended way), in a variety of different ways. In one example, surreptitious prompt processing system 188 vectorizes (creates a vector from) the prompt and compares that vector to other vectors generated from prompts that were known or discovered to be nefarious or surreptitious. Based upon the similarity of the vectors, surreptitious prompt processing system 188 can identify the prompt as surreptitious or as valid.

Target model identifier 212 then identifies a particular target generative AI model (or cluster) where the request is to be routed. To identify the target model, token evaluator 214 can evaluate the tokens in the prompt (and/or other items in the prompt) to determine the likely length of the requested generation. For instance, if the requested generation is a summarization of a longer document, the expected length of the requested generation may be relatively short (e.g., 50 words). Similarly, if the requested generation is generation for a chatbot, the expected requested generation may also be relatively short (e.g., 10 words). However, if the requested generation is to generate a document given a subject, then the requested generation may be 500 words, 1,000 words, or more. Token evaluator 214 thus generates an estimate or another output indicative of the expected length of the requested generation.

Generative load identifier 216 generates an output indicative of the processing load that the requested generation will place on the target generative AI model. Capacity evaluator 218 then evaluates the current available capacity for different generative AI models of the requested generative AI model type, along with the generative load that will be placed on that model if it is chosen as the target generative AI model to service this generative AI request. Capacity evaluator 218 can perform this type of evaluation for a plurality of different generative AI models that are of the type requested to identify a target generative AI model to which this request will be sent. Target model calling system 222 then calls the target generative AI model (or model cluster) in generative AI model layer 104. Response processor 189 receives the response from the target generative AI model and passes that response back to the requesting entity (e.g., client app 102, development platform 114, etc.).

Prompt/response data collection processor 132 collects data corresponding to the prompt and response for the generative AI request so that the data can be sent to prompt/response storage system 116 for further processing and storage. Therefore, prompt/response capture system 226 captures data indicative of the prompt and the response. User interaction capture system 228 can capture any user interactions with the response. For instance, when the user has edited the response, those interactions can be captured at the client application 102 or the development platform 114 and returned to system 228. Metadata capture system 230 captures any other metadata corresponding to the prompt and/or response (such as the context data that was used, user metadata, the augmented data that was used, the latency with which the response was returned by the target generative AI model, the target model that processed the prompt, among other things). Prompt store interaction system 232 then interacts with prompt/response storage system 116 to send the collected data to system 116 for further processing and storage.

Figure 3:
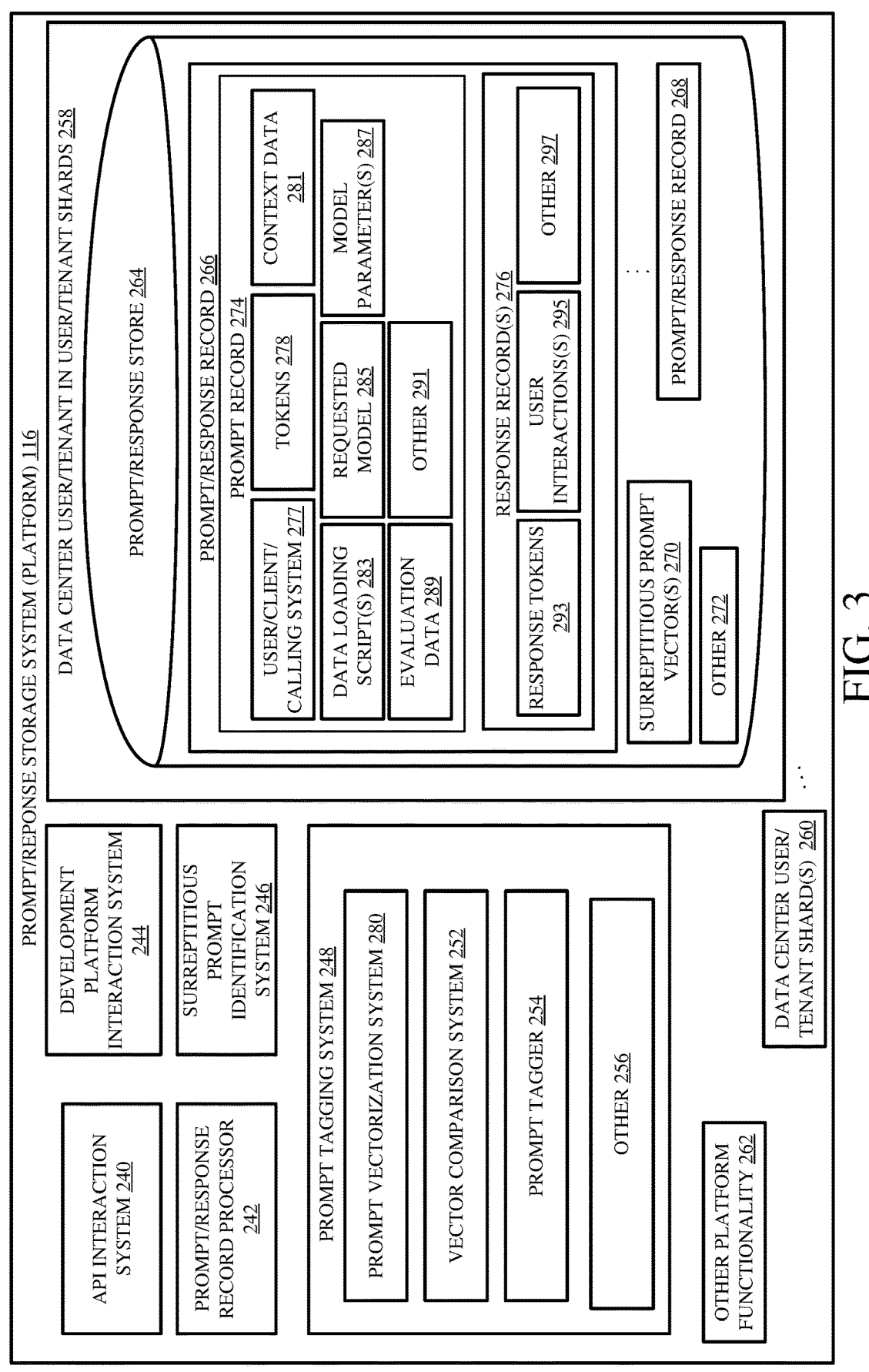
FIG. 3 is a block diagram showing one example of a prompt/response storage system (or platform).

FIG. 3 is a block diagram showing one example of prompt/response storage system (platform) 116 in more detail. System 116 includes API interaction system 240, prompt/response record processor 242, development platform interaction system 244, surreptitious prompt identification system 246, prompt tagging system 248 (which, itself, can include prompt vectorization system 250, vector comparison system 252, prompt tagger 254, and other items 256), data center user/tenant data shards 258-260, and other platform functionality 262. In the example shown in FIG. 3, user/tenant data shards 258 can each have a prompt/response store 264 which includes prompt/response records 266-268, surreptitious prompt vectors 270, and other items 272. Each of the prompt/response records 266 can include a prompt record 274 and a response record 276. Prompt record 274 illustratively includes the data collected by prompt/response data collection system 132 in API 106. Thus, prompt record 274 can include user/client/calling system (or tenant) identifier 277 which identifies the particular entity that made the generative AI request. Prompt record 274 can include the tokens 278 generated from the prompt, context data 281, data loading scripts 283, model identifier 285 identifying the target generative AI model, the model parameters 287 that were passed into the model (including the operational model parameters, the model input parameters, and other model parameters), any evaluation data 289 generated for the prompt and/or response, and/or model, and any of a wide variety of other data 291.

The response records 276 can include response tokens 293 generated by the generative AI model, any user interactions 295 with the response, and any of a wide variety of other data 297. In addition to storing the prompt/response records 266-268 in the data shards for the particular user or tenant that generated the corresponding generative AI request, system 116 can receive inputs either through API 106 or from generate AI development platform 114. Prompt/ response record processor 242 can generate the prompt/ response records 266-268 according to a known schema or template, or in other ways.

Surreptitious prompt identification system 246 can process any new prompts that have been identified by an external system (manual or automated system) as being surreptitious or nefarious prompts. System 246 can generate a vector corresponding to the newly identified surreptitious prompt so that the surreptitious prompt vectors 270 can be modified to contain the new vector.

Prompt tagging system 248 can process any newly received prompts (that have not already been identified as surreptitious) to determine whether they are surreptitious. Prompt vectorization system 250 can generate a vector corresponding to the newly received prompt, and vector comparison system 252 can compare that vector against the surreptitious prompt vectors 270 to determine whether the newly received prompt is surreptitious (and has not already been identified as surreptitious from an external system, such as from a developer, user, another AI system, etc.). Prompt tagger 254 can generate a tag for the prompt identifying the prompt as surreptitious, as non-surreptitious, or identifying the prompt in another way.

It will be noted that API interaction system 240 and development platform interaction system 244 can be used to share the prompt/response records 266-268 in a compliant manner. The systems 240 and 244 can share the prompt/ response records within a predefined scope (such as within the tenant/user data stores, or shards in a data center) so that they are compliant, or systems 240 and 244 can remove the responses or the customer data from the prompts and/or responses or can share the prompt/response records 266-268 in another way.

Figure 4:
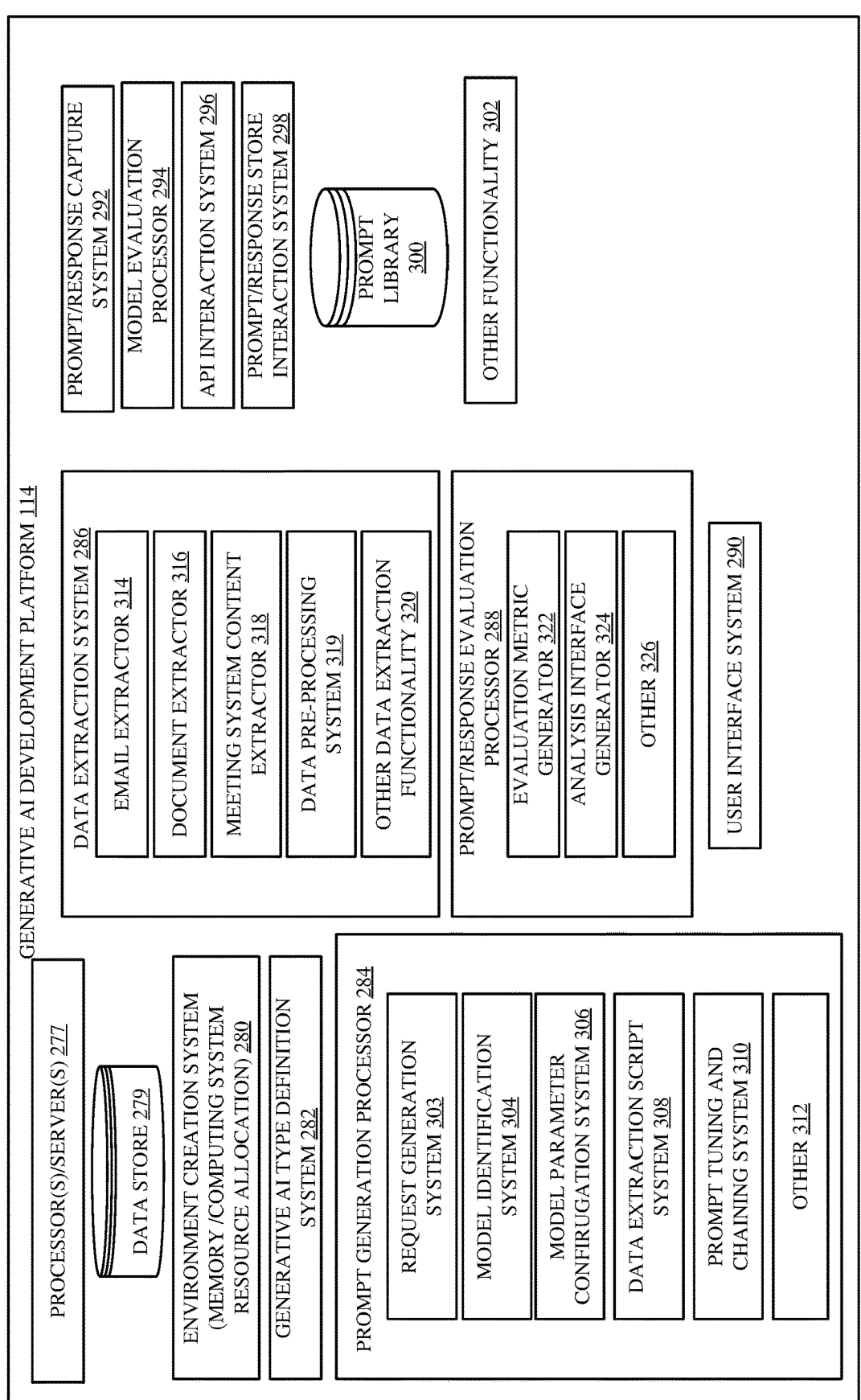
FIG. 4 is a block diagram showing one example of a generative AI development platform.

FIG. 4 is a block diagram showing one example of generative AI development platform 114 in more detail. In the example shown in FIG. 4, development platform 114 includes processors or servers 277, data store 279, environment creation system 280, generative AI type definition system 282, prompt generation processor 284, data extraction system 286, prompt/response evaluation processor 288, user interface system 290, prompt/response capture system 292, model evaluation processor 294, API interaction system 296, prompt/response store interaction system 298, prompt library 300, and other functionality 302. Prompt generation processor 284 can include request generation system 303, model identification system 304, model parameter configuration system 306, data extraction script system 308, prompt tuning and chaining system 310, and other items 312. Data extraction system 286 can include email extractor 314, document extractor 316, meeting system content extractor 318, data pre-processing system 319, and other data extraction functionality 320. Prompt/response evaluation processor 288 can include evaluation metric generator 322, analysis interface generator 324, and other items 326.

User interface system 290 generates a user interface that can be accessed by a developer or other user. The developer or other user can use environment creation system 280 to create a development environment for use by development platform 114. The environment can include memory and computing system resource allocations and other environmental allocations. The developer or user can then use generative AI type definition system 282 to specify the type of generative AI system that is being developed. For instance, the generative AI system maybe a document summarization system, a question answering system, a text generation system, or any of a wide variety of other AI generation systems. Further, system 280 and/or system 282 can be used to expose more or less functionality of platform 114 to the developer based on the type of user experience desired. If the developer is in a very early exploration phase of development, simply trying to gain a basic understanding of generative AI systems, then platform 114 may expose less functionality than when the developer is in an experimentation or evaluation phase, in which case the full functionality of platform 114 is exposed to the developer. The level of functionality exposed to the developer can be selected by the developer, can be based on the subscription level, or based on other criteria.

The developer or user can use the functionality in prompt generation processor 284 to begin generating and tuning prompts that can be used in the generative AI system being developed. Request generation system 303 can be used by the user or developer to generate a request portion which may include, for example, words or instructions to the generative AI model (the words may be tokenized during later processing). Model identification system 304 can be used to identify the particular type of generative AI model to be used. Model parameter configuration system 306 can be used to set or otherwise configure the model parameters to be used in the generative AI system. Data extraction script system 308 can be used to generate or configure data extraction scripts that can be executed in order to extract context data or augmented data that will be used by the system. Prompt tuning and chaining system 310 can be used to tune prompts and/or design prompt chaining algorithms which can be used to process prompts or requests and break them into a plurality of chained prompts or requests or system 310 can be used to generate the chained prompts or requests themselves. Generating, tuning, and chaining prompts is described in greater detail below with respect to FIG. 10C, and elsewhere herein.

Data extraction system 286 can be used by the user or developer to extract data for use in the development environment created in the development platform 114 by the user or developer. Electronic mail (email) extractor 314 can be used to extract email data for the user or developer. Document extractor 316 can be used to extract documents available to the user or developer, and meeting system content extractor 318 can be used to extract meeting system content (such as meeting notes, meeting transcriptions, meeting dates, and other meeting content). Data pre-processing system 319 can be used by the developer to call data processing systems to perform pre-processing on the extracted data.

Such pre-processing can include filtering, aggregation, compression, among a wide variety of other types of pre-processing.

Prompt/response capture system 292 can be used to capture the prompts and responses generated in and received by the environment in development platform 114 so that the prompts and responses can be evaluated by prompt/response evaluation processor 288 and then tuned by the user or developer, as needed. Prompt/response capture system 292 can thus be similar to prompt/response data collection system 132 shown in FIG. 2, or different. For the purposes of the present discussion it will be assumed that they are similar. That is for the sake of example only.

Evaluation metric generator 322 can be another generative AI model, or a different type of system or algorithm, that generates evaluation metrics indicative of the performance of the prompt in obtaining the desired generation from the generative AI model. Analysis interface generator 324 generates an analysis interface that can be surfaced (e.g., displayed) for the user or developer through user interface system 290. The analysis interface generated by generator 324 can be used by the developer or user to analyze and evaluate the prompts. Therefore, the analysis interface may display the prompts and responses in a correlated manner so that the developer or user can easily identify the portions of the prompt that influenced a particular generation. The analysis interface can also allow the developer to edit the prompt and re-run it against the generative AI models to evaluate its performance.

Model evaluation processor 294 can be an algorithm or another AI model or system that can evaluate the particular type of generative AI model chosen by the developer or user. Model evaluation processor 294 can run the prompt against a plurality of different types of generative AI models to generate comparative results to compare the performance of different generative AI models or the different types of generative AI models so that the developer or user can determine when to switch to a different generative AI model or a different type of generative AI model which may perform better than the currently selected generative AI model.

Based upon the inputs by the developer, API interaction system 296 can interact with API 106 to submit the generative AI requests from the development environment in development platform 114 to the generative AI models in layer 104 through API 106. In this way, the user or developer can submit prompts and receive responses on the actual types of generative AI models that will be used in the production environment, although the user or developer can do so in a compliant manner by using the developer's own data or data to which the developer has access and by using the experimentation pool 110 of GPUs to execute the models.

Prompt/response store interaction system 298 can be used to interact with the prompt/response storage system 116 to store prompts for reuse and for further tuning. Further, system 298 can be used to interact with the prompt/response storage system 116 to automatically load prompts from system 116 into prompt library 300 where they can be used in generating and configuring additional prompts in the generative AI system being developed by the user or developer. By automatically it is meant, for example, that the function or operation can be performed without further human involvement except, perhaps, to initiate or authorize the function or operation.

Figure 5A:
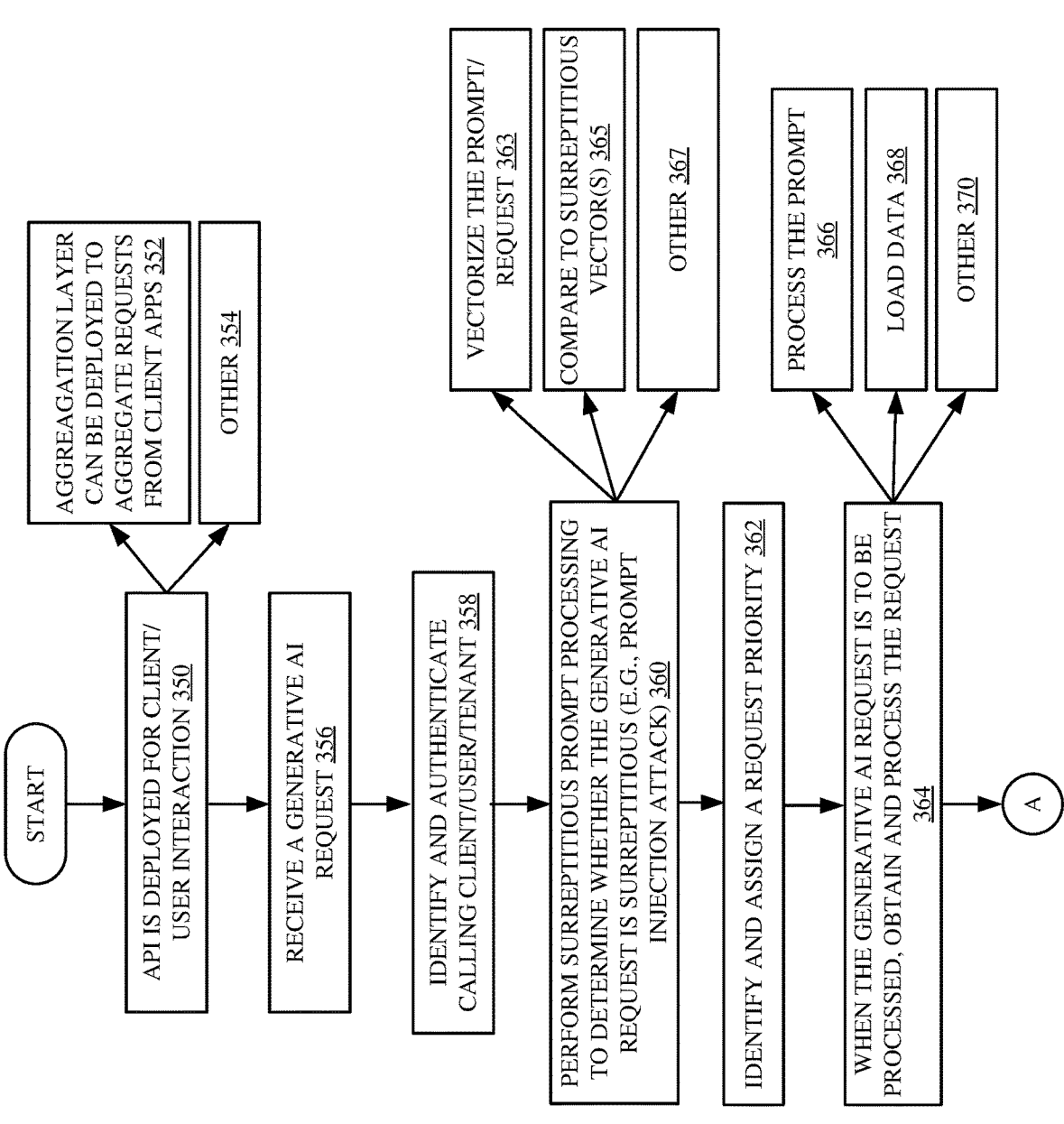
FIGS. 5A and 5B (collectively referred to herein as FIG. 5) show a flow diagram illustrating one example of the operation of a generative AI model API.
Figure 5B:
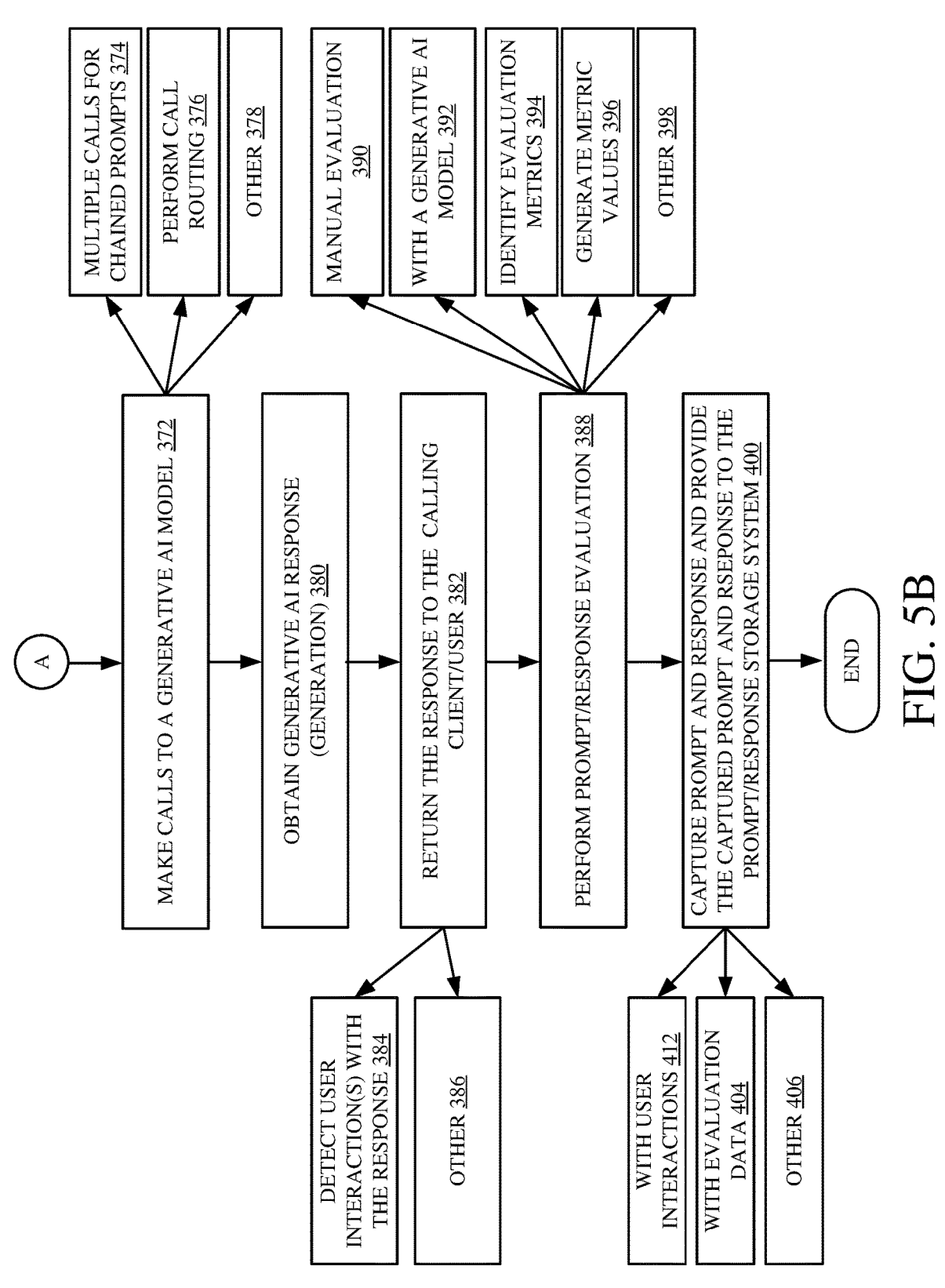

FIGS. 5A and 5B (collectively referred to herein as FIG. 5 show a flow diagram illustrating one example of the operation of generative AI model API 106 in receiving generative AI requests from one or more client applications 102 (or from LLM development platform 114) either directly or through aggregation layer 112. It is assumed that API 106 is deployed for client/user interaction (e.g., for interaction by the client applications 102 and/or the development platform 114) as indicated by block 350 in the flow diagram of FIG. 5. It will noted that aggregation layer 112 can be deployed to aggregate requests from the individual client applications 102, as indicated by block 352, so those requests can be processed in batches or in other ways. The API 106 can be deployed in other ways as well, as indicated by block 354.

Interface generator 124 then generates an interface to the functionality in API 106 and API 106 receives a generative AI request through the interface, as indicated by block 356. Authentication system 126 identifies and authenticates the calling client/user/tenant, as indicated by block 358 in the flow diagram of FIG. 5. The authentication can be performed using a token issuer and authentication tokens, using system or user credentials, or in other ways.

Surreptitious prompt processing system 188 can perform processing to determine whether the generative AI request is surreptitious, as indicated by block 360 in the flow diagram of FIG. 5. For instance, as discussed above, system 188 can vectorize the generative AI request, as indicated by block 362 and compare the vector to surreptitious vectors 270, as indicated by block 364. The vectors can contain values indicative of a wide variety of information relative to the request, such as where the request originated from, the tokens or scripts or other content in the request, or a wide variety of other values. System 188 can perform surreptitious prompt processing in other ways as well, as indicated by block 366.

Assuming that the prompt or generative AI request is not surreptitious, then generative AI request priority system 128 identifies and assigns a request priority to the generative AI request as indicated by block 362. Identifying and assigning the priority is described in greater detail elsewhere herein (such as, for example, with respect to FIG. 6). When the generative AI request is to be processed (e.g., when it is at the top of one of the priority queues), then the generative AI request is obtained and processed by generative AI request processing system 130 (shown in FIG. 2) as indicated by block 364 in the flow diagram of FIG. 5. For instance, the prompt can be processed, as indicated by block 366. Data can be loaded using the data extraction scripts, as indicated by block 368 in the flow diagram of FIG. 5. The generative AI request can be processed in other ways as well, as indicated by block 370 in FIG. 5, and as discussed in greater detail elsewhere herein (such as, for example, with respect to FIGS. 7 and 8).

Generative AI request routing system 186 then identifies a target generative AI model for the request and makes calls to the target generative AI model, as indicated by block 372 in the flow diagram of FIG. 5. In one example, multiple calls (e.g., chained prompts) can be made to service the generative AI request, and those calls may be executed as chained prompts, or other calls. Making multiple calls to execute the generative AI request is indicated by block 374 in the flow diagram of FIG. 5.

Generative AI request routing system 186 performs call routing by evaluating available capacity and routing the request to an appropriate generative AI model, as indicated by block 376. Call routing is described in greater detail elsewhere herein (such as below with respect to FIG. 8). The calls to the generative AI model can be made in other ways as well, as indicated by block 378.

Response processor 189 then receives or obtains a generative AI response (or generation) from the target generative AI model, as indicated by block 380 in the flow diagram of FIG. 5. Response processor 189 returns the response to the calling client/user/tenant (e.g., calling client application 102 or development platform 114) as indicated by block 382 in the flow diagram of FIG. 5. In one example, user interactions with the response can be detected and stored as well, as indicated by block 384. The response can be returned in other ways as well, as indicated by block 386.

Supervision/evaluation system 134 can then perform prompt/response evaluation, as indicated by block 388. System 134 can generate a user interface so that the evaluation can be performed manually, as indicated by block 390, or the evaluation can be performed by another generative AI model, as indicated by block 392. The system can identify evaluation metrics and generate metric values for those metrics, as indicated by blocks 394 and 396. The evaluation can be performed in other ways as well, as indicated by block 398.

Prompt/response data collection processor 132 captures data corresponding to the prompt and response and provides the captured prompt and response data to the prompt/response storage system 116, as indicated by block 400 in the flow diagram of FIG. 5. The data can include the prompt tokens, parameters, and other prompt-related information, response content, any detected user interactions 402 and any evaluation data 404 as well as other information 406.

Figure 6:
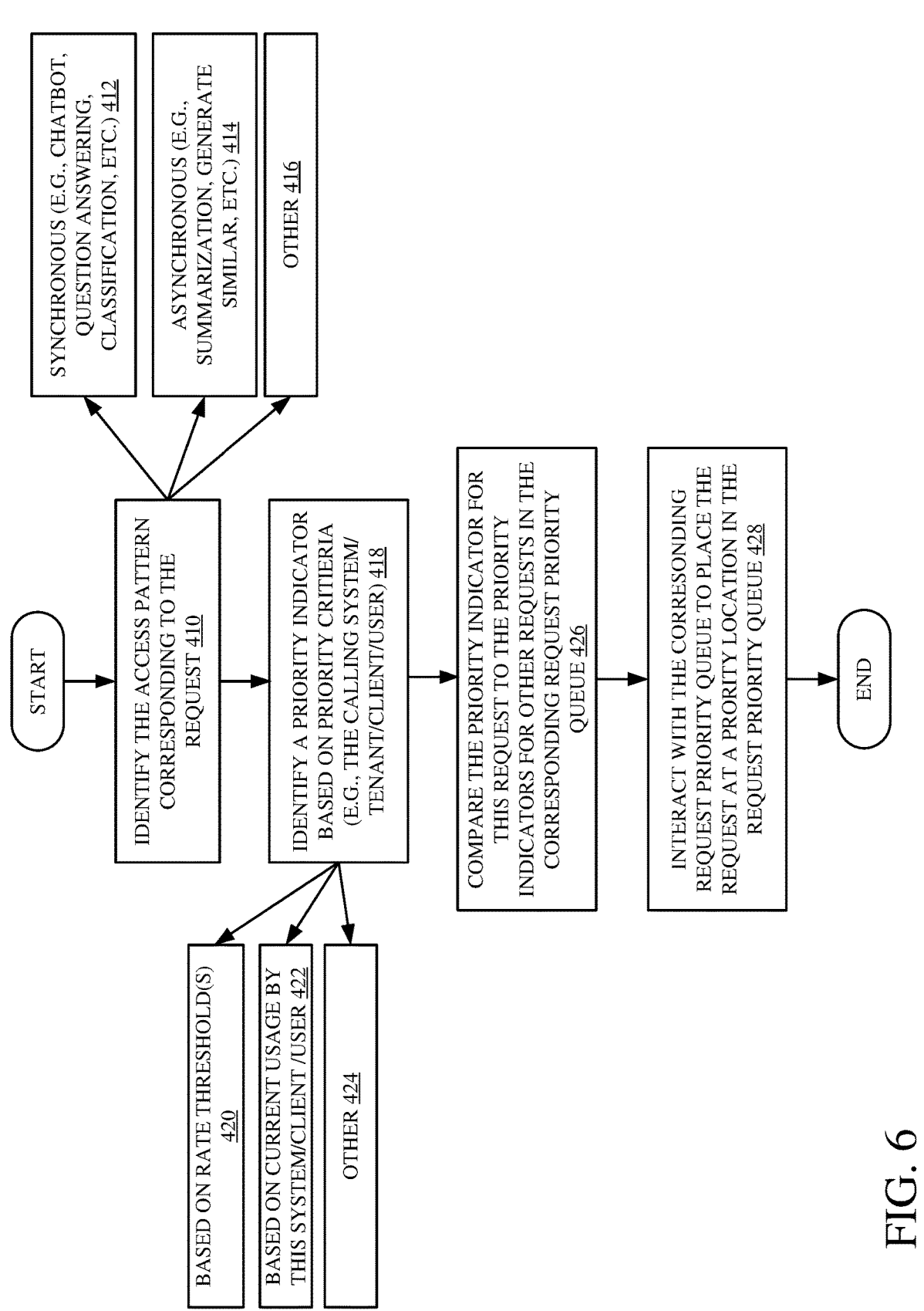
FIG. 6 is a flow diagram illustrating one example of the operation of assigning priority to a generative AI request.

FIG. 6 is a flow diagram illustrating one example of the operation of generative AI request priority system 128, in identifying and assigning a request priority to a generative AI request. Access pattern identifier 156 first identifies the access pattern corresponding to the request, as indicated by block 410 in the flow diagram of FIG. 6. For instance, the access pattern may indicate that the request is a synchronous request 412 (such as may be used by a chatbot, a question answering system, a classification system, etc.). Access pattern identifier 166 may identify the access pattern as asynchronous 414 (such as may be used by a summarization system, a generate similar system, etc.). The access pattern may be identified in other ways as well, as indicated by block 416.

Priority criteria evaluation system 168 then determines a priority indicator corresponding to the generative AI request by evaluating priority criteria (such as the calling system, tenant, client, or user, or other priority criteria) as indicated by block 418 in the flow diagram of FIG. 6. Dynamic rate limiting processor 170 can then determine whether the priority should be modified based on the rate at which this particular system or entity is making generative AI requests and whether the rate exceeds a request threshold for this particular requesting system or entity. Modifying the priority based on whether the rate thresholds are exceeded or met is indicated by block 420 in the flow diagram of FIG. 6. As discussed above, processor 170 can dynamically modify these thresholds based upon the time of day, based on the current traffic level, based upon the current usage by this particular system/tenant/client/user, etc., as indicated by block 422. The priority can be identified in other ways as well, as indicated by block 424.

Once this particular generative AI request has been assigned a priority, priority comparison system 174 compares the priority indicator for this particular generative AI request to the priority indicators for other requests in the corresponding request priority queue 176 or 178. Comparing the priority indicators is indicated by block 426 in the flow diagram of FIG. 6. Priority comparison system 174 then identifies where, in the proper priority queue, the present request should be inserted and places the present generative AI request in the queue in the desired location. Interacting with the request priority queue to place the current request at a priority location in the request priority queue is indicated by block 428 in the flow diagram of FIG. 6.

Figure 7:
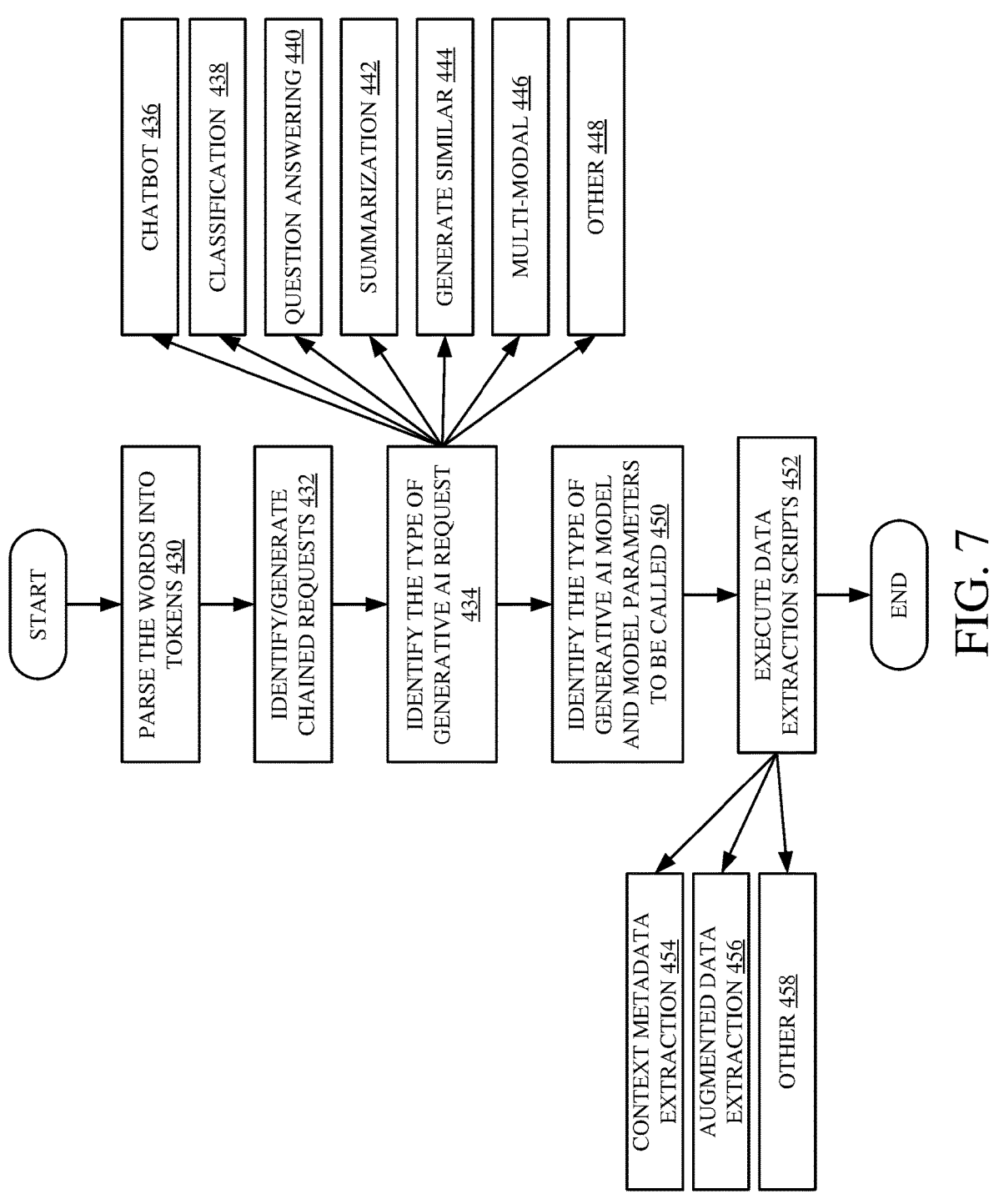
FIG. 7 is a flow diagram illustrating one example of the operation of processing a prompt in a generative AI request.

FIG. 7 is a flow diagram illustrating one example of the operation of prompt processor 182 and data loading system 184 in processing a prompt so that the prompt can be routed to a target generative AI model by generative AI request routing system 186. Parsing system 192 parses the words in the request into tokens, as indicated by block 430 in the flow diagram of FIG. 7. The tokens may be individual words, noun phrases, clauses, or other parts of speech or other tokens. Parsing system 192 also identifies different parts of the prompt (such as tokens, scripts, model parameters, etc.) and parses them out so that they can be treated separately, if needed.

Parsing system 192 can also identify or generate chained requests or prompts that need to be executed in order to execute the prompt. Identifying or generating chained requests is indicated by block 432 in the flow diagram of FIG. 7. For instance, assume that a generative AI request is asking the model to summarize individual emails and email threads received on a particular day. In that case, the prompt would need to first identify and retrieve all emails received on that day, then identify the contents of the individual emails and the threads, and then perform summarization on those contents. These types of chained requests can be identified or generated in executing the prompt.

Request type identifier 196 identifies the type of generative AI request, as indicated by block 434. For instance, the request can be a request from a chatbot 436, a classification request 438, a question answering request 440, a summarization request 442, a generate similar request 444, a multimodal request 446, or another type of generative AI request 448. Called model identifier 198 identifies the type of generative AI model that has been specified in the prompt, and model parameter identifier 200 identifies any model parameters that have been specified in the prompt. Identifying the type of generative AI model and model parameters is indicated by block 450 in the flow diagram of FIG. 7.

Data extraction identifier 202 identifies any data extraction scripts that are to be executed to obtain context data or augmented data. Data loading system 184 then executes the data extraction scripts to extract the data that is to be provided to the target generative AI model. Executing the data extraction scripts to load the extracted data is indicated by block 452 in the flow diagram of FIG. 7. Context data loader 206 extracts and loads context data or other metadata, as indicated by block 454, and augmented data loader 208 extracts and loads any augmented data, as indicated by block 456. Data extraction can be performed in other ways as well, and other types of data can be extracted, as indicated by block 458.

Figure 8:
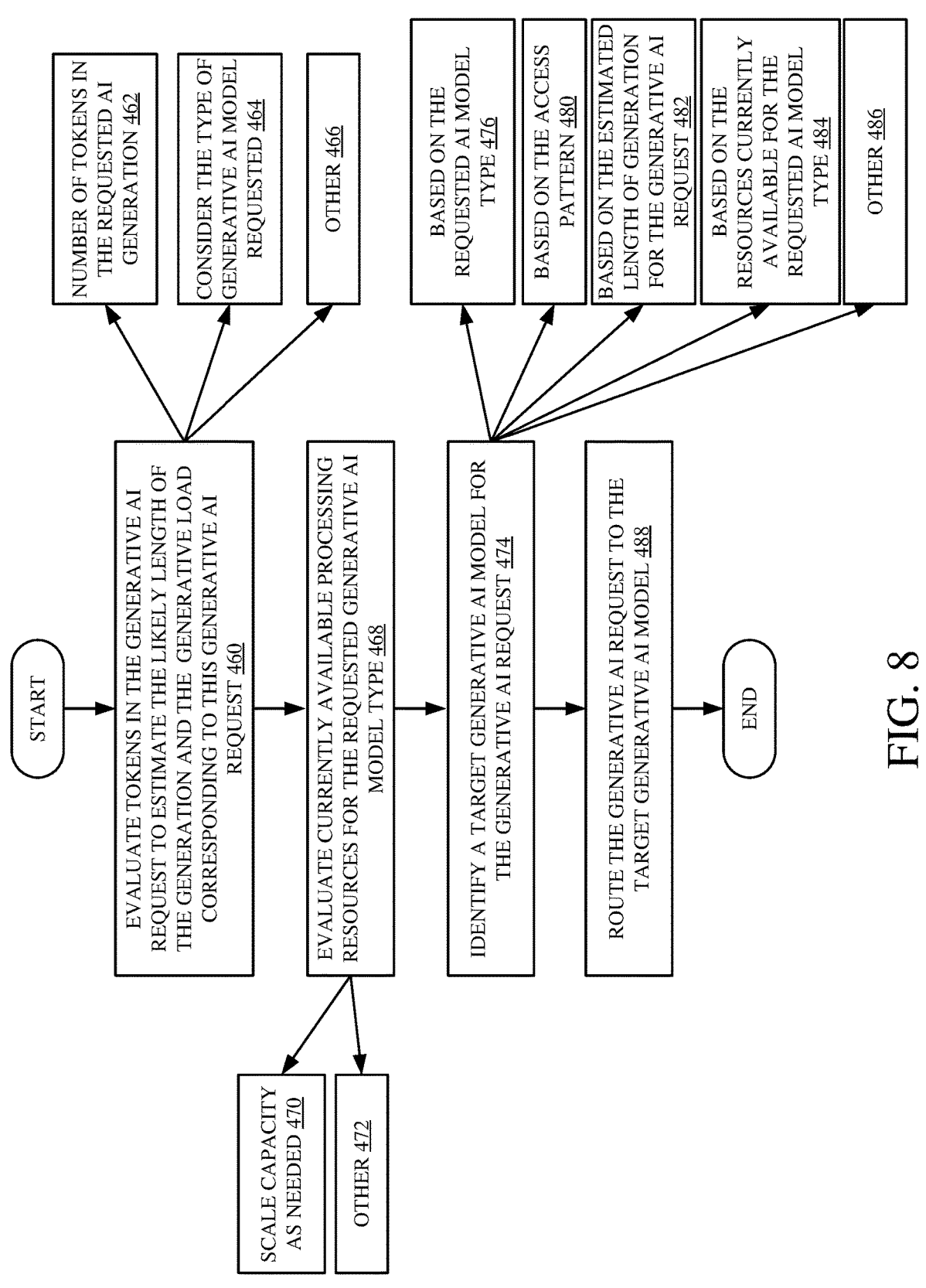
FIG. 8 is a flow diagram showing one example of routing a generative AI request to a target generative AI model.

Target model identifier 212 is then ready to identify a target AI model (or cluster) where the request should be sent, and route the request to that target AI model. FIG. 8 is a flow diagram illustrating the operation of generative AI request routing system 186 in performing these operations. Token evaluator 214 first evaluates the tokens in the generative AI request to estimate the likely length of the generation that will be returned by the generative AI model. Generative AI load identifier 216 identifies the generative load corresponding to this generative AI request, based upon the likely length of the generation. Identifying the likely length of the generation and the generative load corresponding to this generative AI request is indicated by block 460 in the flow diagram of FIG. 8. The generative load may be identified in terms of the computing system resources needed to perform the generation, the amount of time that one or more GPUs may be needed to execute the model in order to perform the generation, the amount of memory needed in performing the generation, or other items used in responding to the generative AI request. The likely length of the generation may be measured in terms of the number of tokens in the requested AI generation (or the maximum number of tokens allowed for the generation), as indicated by block 462. The generative load identifier 216 may also consider the type of generative AI model requested, as indicated by block 464 (e.g., long generations performed by certain types of AI models may place a greater load on those models than long generations on other types of AI models, etc.). Likely length of the generation and the generative load can be identified or measured in other ways as well, as indicated by block 466.

Capacity evaluator 218 then evaluates the current available processing resources or capacity for different GPU clusters running the requested generative AI model type, as indicated by block 468. That is, for the type of generative AI model needed to process this generative AI request, how much available capacity does each of those generative AI models (or model clusters) currently have. Capacity evaluator 218 evaluates how busy the different generative AI models or clusters (running the requested AI model type) are to determine which AI models or clusters, of the desired type, may have capacity to serve the generative AI request. It will be noted that cluster capacity scaling system 136 can scale the capacity, as needed, as indicated by block 470, and evaluation of the capacity can be done in other ways as well, as indicated by block 472.

Based upon the generative load corresponding to this generative AI request and the available capacity identified by capacity evaluator 218, target model identifier 212 identifies a target generative AI model (or model cluster) for serving this generative AI request, as indicated by block 474 in the flow diagram of FIG. 8. Identifying the target generative AI model based upon the requested model type is indicated by block 476. Identifying the target AI model based upon the access pattern is indicated by block 480. Identifying the target AI model based upon the estimated length of the generation and the generative load for the current generative AI request is indicated by block 482. Identifying the target generative AI model based upon the resources currently available for the requested AI model type is indicated by block 484 in the flow diagram of FIG. 8. The target generative AI model can be identified in other ways as well, as indicated by block 486.

Once the target generative AI model (or model cluster) has been identified, then target model calling system 222 routes the generative AI request to the target generative AI model, as indicated by block 488 in the flow diagram of FIG. 8.

Figure 9:
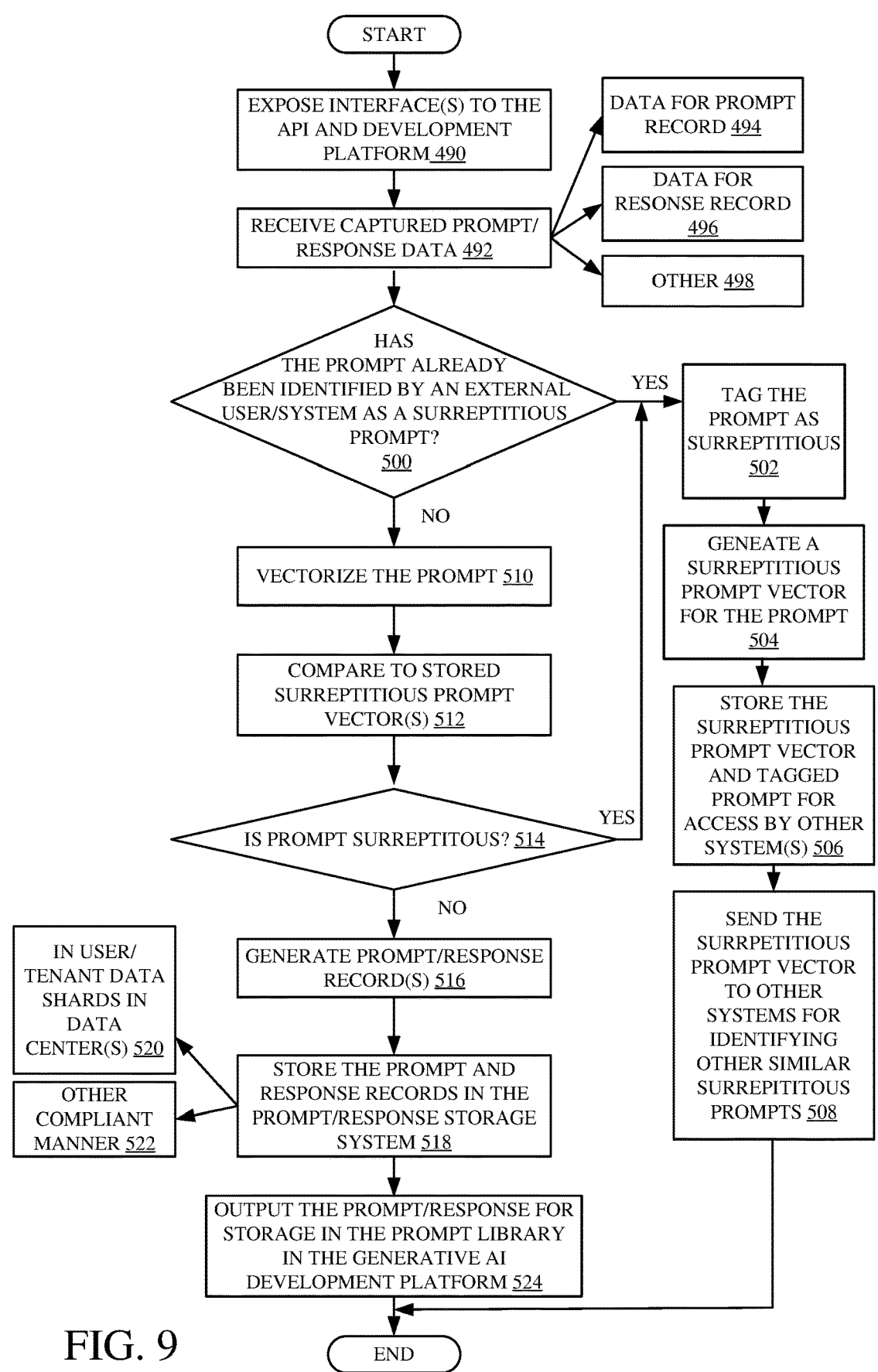
FIG. 9 is a flow diagram illustrating one example of the operation of the prompt/response storage system illustrated in FIG. 3.

FIG. 9 is a flow diagram illustrating one example of the operation of prompt/response storage system 116 in receiving or obtaining, processing, and storing prompt/response records. API interaction system 240 and development platform interaction system 244 first expose an interface that can be accessed by both generative AI model API 106 and development platform 114, as indicated by block 490 in the flow diagram of FIG. 9.

System 116 then receives captured prompt/response data as indicated by block 492. The data can include data for prompt record 274, as indicated by block 494 and data for response record 276, as indicated by block 496 in the flow diagram of FIG. 9. The prompt/response data can include a wide variety of other data as well, such as user-related data or other data as indicated by block 498. Surreptitious prompt identification system 246 then determines whether the prompt has already been identified by an external user or system as a surreptitious prompt. This determination is indicated by block 500 in the flow diagram of FIG. 9. If so, then prompt tagging system 248 tags the prompt as surreptitious, as indicated by block 502 and prompt vectorization system 250 generates a surreptitious prompt vector for the prompt, as indicated by block 504. The surreptitious prompt vector is then stored as a surreptitious prompt vector 270 as indicated by block 506 in the flow diagram of FIG. 9. The surreptitious prompt vector can then be sent to other systems for identifying other, similar surreptitious prompts, as indicated by block 508.

If, at block 500, the prompt has not already been identified as a surreptitious prompt, then prompt tagging system 248 evaluates the prompt against the other surreptitious prompt vectors 270 to determine whether the prompt should be identified as surreptitious based on its comparison to prior surreptitious prompt vectors 270. Thus, prompt vectorization system 250 generates a vector for the prompt, as indicated by block 510, and vector comparison system 252 compares that vector with the surreptitious prompt vectors 270 to determine whether the newly generated vector is sufficiently similar to one of the surreptitious prompt vectors 270 as to warrant tagging the prompt as a surreptitious prompt. Comparing the vectors is indicated by block 512. If the prompt is to be tagged as surreptitious, as indicated by block 514, then processing moves to block 502. However, if, at block 514 it is determined that the prompt is not to be tagged as surreptitious, then prompt/response record processor 242 generates the prompt/response records 274 and 276. Generating those records is indicated by block 516 in the flow diagram of FIG. 9. In one example, the data is stored in user/tenant data shards, as indicated by block 520. Therefore, the data in the records can be personalized by processor 242 based on other user or tenant data. Similarly, the order of the records in the store or metadata associated with the records can be personalized based on user or tenant data as well. The data can be stored in other ways so that the data maintains compliance with any data access rules or regulations or restrictions, etc., as indicated by block 522. Also, the prompt/response records can be output for storage in the prompt library 300 in the development environments created in development platform 114. Outputting the prompt/response records for storage in the prompt library is indicated by block 524 in the flow diagram of FIG. 9. When any of the prompt/response records are output for access by a wider user group (such as outside the tenant/user data shards) then the prompt/response records can be processed by prompt/response record processor 242 to remove customer or other user data, to remove the response portion of the records, or to process the records in other ways to maintain compliance.

Figure 10A:
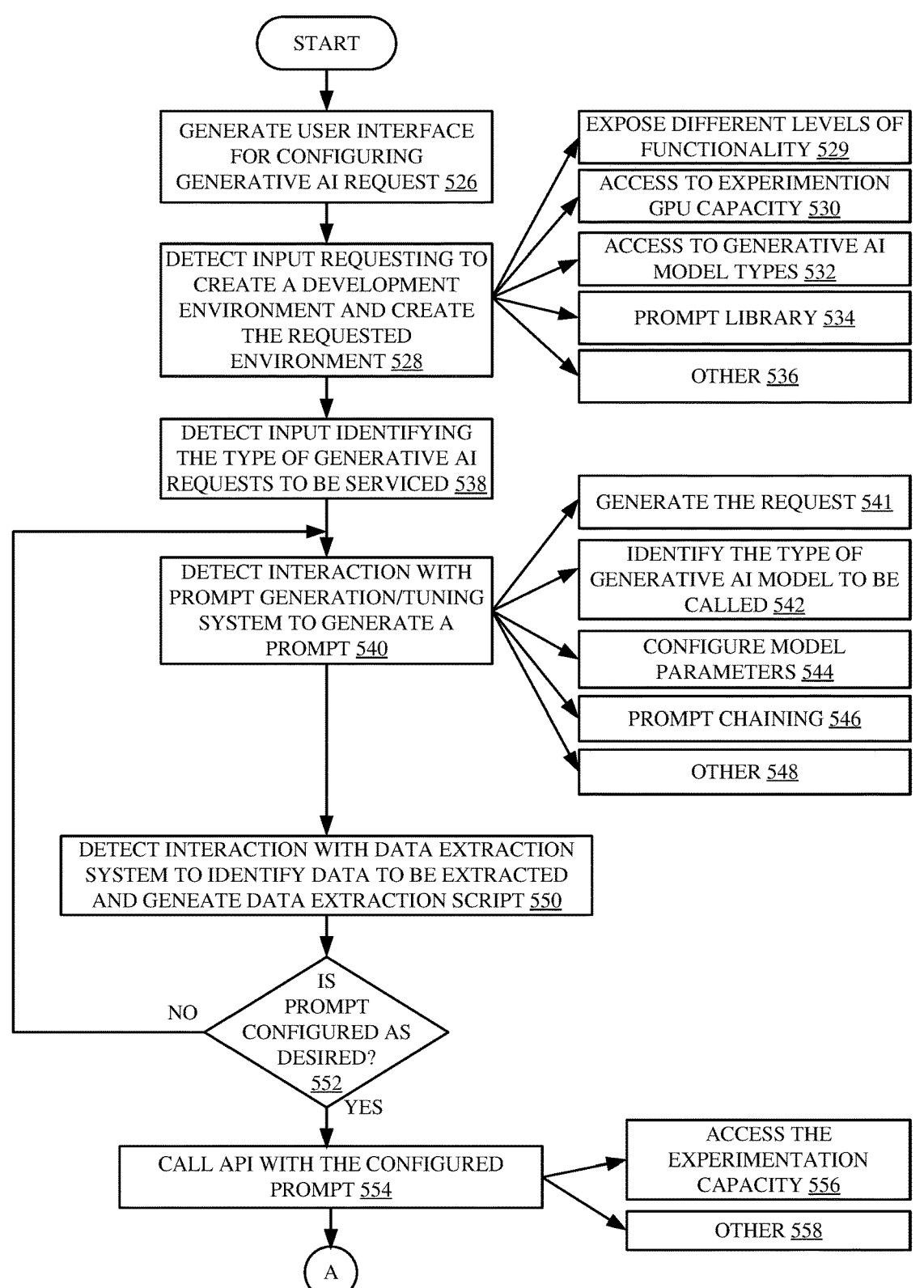
FIGS. 10A and 10B (collectively referred to herein as FIG. 10) show one example of the operation of the generative AI development platform.
Figure 10B:
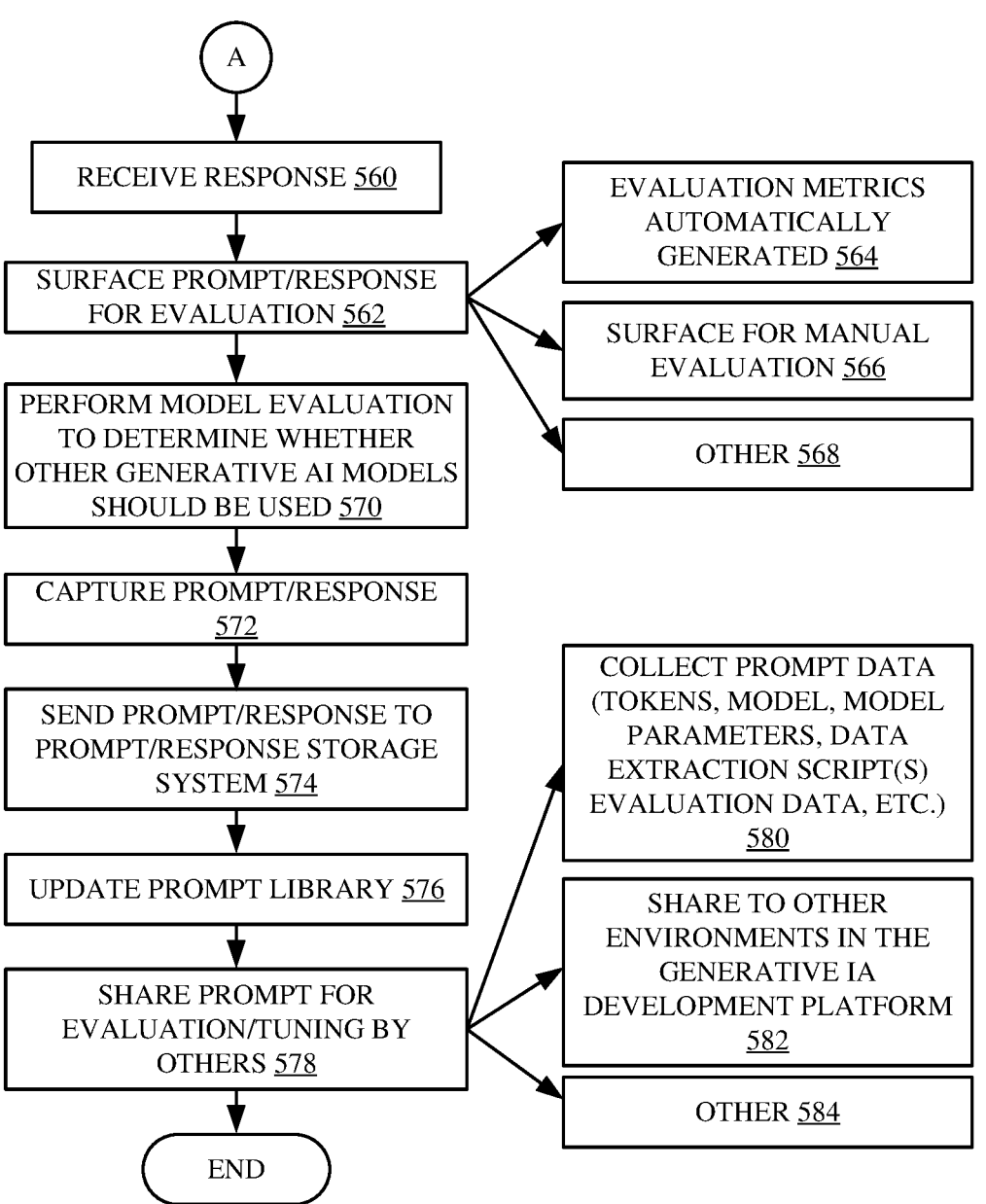

FIGS. 10A and 10B (collectively referred to herein as FIG. 10) show a flow diagram illustrating one example of the operation of generative AI development platform 114. User interface system 290 first generates a user interface for use by a developer in accessing the functionality in platform 114, such as in configuring a generative AI request and performing other development tasks, as indicated by block 526 in the flow diagram of FIG. 10. Environment creation system 280 detects an input through user interface system 290 indicative of a request to create a development environment on platform 114, and environment creation system 280 creates that environment, as indicated by block 528. System 280 may create an environment with different levels of access to the functionality on platform 114 based on a user selection, based on user or tenant-related criteria (such as subscription level, etc.), or based on other criteria. Exposing different levels of functionality is indicated by block 529 in FIG. 10. For instance, the created environment may provide the user or developer with access to experimentation GPU capacity in the experimentation pool 110 of AI model execution layer 106, as indicated by block 530 in the flow diagram of FIG. 10. The environment may provide the user or developer with access to all AI generative model types and will have a prompt library 300. Providing access to the different generative AI model types is indicated by block 532 and providing a prompt library 300 is indicated by block 534 in the flow diagram of FIG. 10. The environment can be created in other ways, with other resources as well, as indicated by block 536.

Generative AI request type definition system 282 exposes an interface actuator or input mechanism that can be used to specify the type of generative AI requests that are to be serviced, in the generative AI system being developed by the user or developer. Detecting an input identifying the type of generative AI system is indicated by block 538 in the flow diagram of FIG. 10.

Development platform 114 can then detect interactions with prompt generation processor 284 to generate or tune or otherwise modify a prompt, as indicated by block 540. Prompt generation and tuning is described in greater detail below with respect to FIG. 10C. As an example, request generation system 303 can generate an interface element, such as a text box that can be actuated to enter or generate or modify a request, such as words or instructions in the prompt that are provided to the generative AI model. Model identification system 304 can generate an interface element that can be actuated to identify the type of generative AI model to be called, as indicated by block 542. Model parameter configuration system 306 can generate an interface element that can be actuated by the user or developer to configure the model parameters to be used by the identified generative AI model. Configuring the model parameters is indicated by block 544 in the flow diagram of FIG. 10. Prompt tuning and chaining system 310 can generate an interface element that can be actuated to select a stored prompt and have a selected prompt automatically populated into an editable prompt template, to specify prompt chaining or other prompt sequencing that is to be used in processing the prompt, as indicated by block 546. Other prompt generation inputs can be detected and used to modify or generate the prompt in other ways, as indicated by block 548. Again, one example of prompt tuning is described elsewhere herein, such as below with respect to FIG. 10C.

Data extraction script system 308 can be actuated to identify data that is to be extracted and to generate the data extraction script for extracting that data, as indicated by block 550. Until the prompt is configured as desired, as indicated by block 552, processing can revert to block 540 where the user or developer can continue to interact with the prompt generation processor 284 to generate and modify the prompt, as desired.

The user or developer may wish to experiment with or test the prompt so API interaction system 296 calls API 106, with the prompt so the prompt can be executed by a generative AI model. Calling the API 106 with the configured prompt is indicated by block 554. Calling API 106 provides the development platform 114 with access to the generative AI models in the experimentation capacity 110 (shown in FIG. 1) as indicated by block 556. The API can be called in other ways as well, as indicated by block 558.

Development platform 114 then receives the response from API 106 through API interaction system 296. Receiving the response is indicated by block 560 in the flow diagram of FIG. 10. System 296 can then surface the prompt and response for evaluation (e.g., through user interface system 290 or prompt/response evaluation processor 288). Surfacing the prompt and response for evaluation is indicated by block 562 in the flow diagram of FIG. 10. Providing the prompt and response for automatic evaluation in which evaluation metrics are generated by evaluation metric generator 332 is indicated by block 564. Surfacing the prompt and response for manual analysis using an analysis interface generated by analysis interface generator 324 is indicated by block 566 in the flow diagram of FIG. 10. The prompt and response can be surfaced for evaluation in other ways as well, as indicated by block 568.

Model evaluation processor 294 can also perform model evaluation to determine whether other types of generative AI models should be used instead of the model type currently specified. Performing model evaluation is indicated by block 570 in the flow diagram of FIG. 10. The evaluation can be done by executing the prompt with two or more different types of generative AI models and comparing the results, or in another way.

Prompt/response capture system 292 captures the prompt and response information so that it can be sent to prompt/response storage system 116 for further processing and storage. Capturing the prompt and response data is indicated by block 572 in the flow diagram of FIG. 10, and sending the prompt/response data to prompt/response storage system 116 for furthering processing and storage is indicated by block 574 in the flow diagram of FIG. 10. System 116 can then update the prompt library 300 in the various development environments on development platform 114, in a compliant manner, as indicated by block 576 in the flow diagram of FIG. 10. The prompt can also be shared for evaluation and tuning by other users or developers, as indicated by block 578. In one example, the prompt/response capture system 292 can collect data from the prompt, such as the tokens, the model used to generate the response, the model parameters, the data extraction scripts, the evaluation data, etc., as indicated by block 580. That collected prompt data can then be shared to other environments in the development platform 114, as indicated by block 582. The prompt can be shared for evaluation and tuning by others in a variety of other ways as well, as indicated by block 584.

Figure 10C:
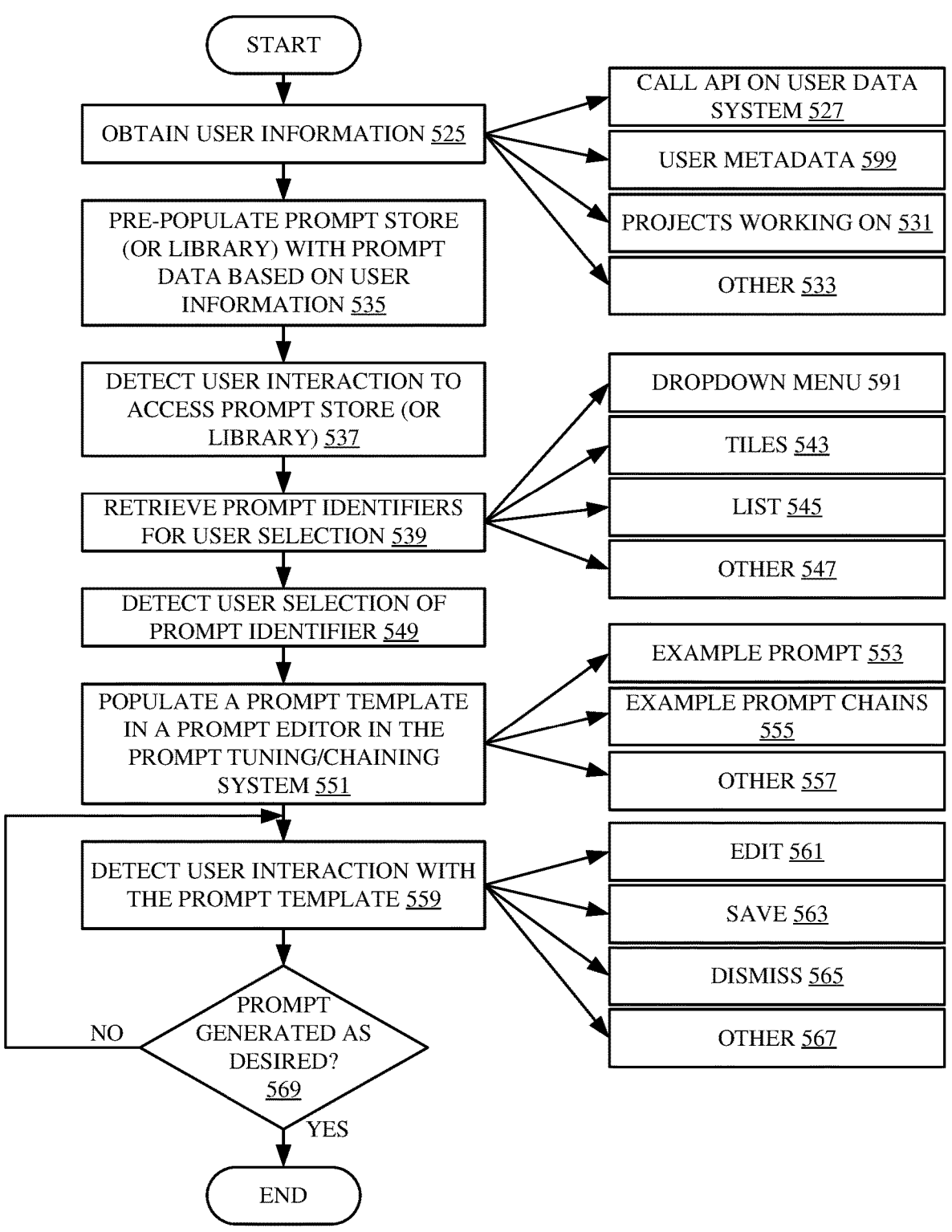
FIG. 10C is a flow diagram showing one example of the operation of the generative AI development platform in exposing a user to prompt generation functionality.

FIG. 10C is a flow diagram illustrating one example of the generative AI development platform 114 in exposing a developer to prompt generation/tuning functionality (as mentioned above with respect to block 540 in FIG. 10A). In one example, when environment creation system 280 is creating the development environment and assigning resources, system 280 can also obtain user information about the developer or user who is interacting with platform 114. Obtaining user information is indicated by block 525 in the flow diagram of FIG. 10C. In one example, system 280 can call an API on a user data system that stores user data (such as information that identifies the user, the user's position in a company, or other user metadata). Obtaining the user data by calling an API is indicated by block 527 and obtaining user metadata is indicated by block 599. System 280 can also obtain access to the projects or other information that the developer is working on or has worked on in the near past, as indicated by block 531. Other user information can be obtained and it can be obtained in other ways as well, as indicated by block 533.

System 280 can then prepopulate the prompt store (or prompt library) with prompt data based upon the user information, as indicated by block 535. For instance, if the user data indicates that the user or developer is working on an electronic mail (email) project, or is responsible for electronic mail (email) projects, then the prompt library or prompt store may be prepopulated with prompts that relate to obtaining generative AI model responses that are related to email information. This is just one example and system 280 can prepopulate the prompt store or prompt library with prompt data that corresponds to prompts based on the obtained user information in other ways as well.

Similarly, instead of having system 280 prepopulate the prompt store or prompt library, any of the items in prompt generation processor 284 can also prepopulate the prompt store or prompt library with prompt information. Further, generative AI type definition system 282 can also prepopulate the prompt store or prompt library based upon the type of generative AI system the developer is intending to develop. For instance, if the AI system is a summarization system, then the prompt library or prompt store can be prepopulated with prompts that are often used in summarization systems. This is just one example.

At some point, request generation system 303 may detect that the user wishes to access the prompt store or prompt library, as indicated by block 537. For instance, on a user interface generated by user interface system 290, a display element (such as a dropdown menu) may be actuatable by the user or developer as a request to see example prompts. In that case, prompt generation processor 284 retrieves prompt identifiers from the prompt library or prompt store and displays them or otherwise surfaces them for selection by the developer. Retrieving the prompt identifier for user selection is indicated by block 539. Retrieving the prompt identifiers for user selection, as illustrated in block 539 of FIG. 10C, may also allow the user to type in a search term to search the prompt store or prompt library for relevant prompts. Semantic processing can be performed on the user search term so that the prompt library or prompt store can be searched to identify relevant prompts that may be returned for user selection (such as populated into a dropdown menu or displayed for selectin in another way), based upon the user or developer input.

The prompt identifiers may be textual descriptions that describe the functionality performed by the prompt, or other identifiers. The identifiers may be displayed in a drop-down menu 591, as tiles 543 on a user interface display, as a list 545, or in other ways 547.

In one example, the prompt identifiers are actuatable so that the user can select one (e.g., by clicking on the prompt identifier on a user interface display). Detecting user selection of one of the prompt identifiers is indicated by block 549 in the flow diagram of FIG. 10C.

Prompt tuning and chaining system 310 then populates a prompt template in a prompt editor (such as a text entry box on a user interface display). Populating a prompt template for tuning or editing or chaining is indicated by block 551 in the flow diagram of FIG. 10C. The prompt template may thus be representative of an example prompt 553 and example prompt chains 555. For instance, once the user or developer identifies the type of prompt that he or she wishes to generate, and selects a prompt identifier, then the example prompt that is retrieved and populated into the prompt editor may show a set of chained prompts that have been used to perform the prompt functionality desired by the user. The prompt template can be populated in the prompt editor in other ways as well, as indicated by block 557.

The developer or user may then interact (e.g., edit) with the prompt template as indicated by block 559. For instance, prompt tuning and chaining system 310 may detect that the user has edited the prompt template as indicated by block 561, saved it as indicated by block 563, dismissed it as indicated by block 565, or has interacted with the prompt in the prompt template in other ways as indicated by block 567. Until the prompt has been generated, as desired by the developer (as indicated by block 569) processing reverts to block 559 where the user may continue to interact with the prompt template to create, edit, or delete the prompt in the prompt template. Also, of course, at any time, the developer may interact with prompt generation processor 284 to move back to a previous point in the flow diagram of FIG. 10C, such as to obtain access to the prompt store or library again as indicated by block 537, or elsewhere.

It can thus be seen that the present description describes a system that includes a development platform for developing, experimenting on, and evaluating generative AI prompts and other parts of a generative AI system that may be surfaced on the canvas of one or more different applications. The development platform provides a mechanism for extracting user data, in a compliant manner, and for increasing the data that is used by the system, for further development, also in a compliant manner. The data may initially comprise the data of the user or developer, but it may be expanded to additional user data where that user's data is from a user who has opted into the development platform. The development platform provides prompt generation and tuning functionality and data extraction functionality and also provides access to the different types of generative AI models that will be used by the system. By providing such functionality in the development environment and through the development platform, the present system reduces bandwidth requirements needed to make separate calls to access such functionality. The access is provided in an experimentation pool to maintain data boundaries and compliance. The prompts can also be stored and reused and shared with others for tuning. Further, the prompts can be populated, automatically, into a prompt library which may be stored in a tenant or user data shard for reuse or in the development environment. This saves computing resources so others need not conduct the same trial and error approach in developing a generative AI system.

The present description also proceeds with respect to a generative AI model API that can be accessed by both the development platform and by production environments. Generative AI requests are prioritized, processed, and routed to a target AI model. The length of the requested generation is considered in determining a generative load that a generative AI request will place on a generative AI model. That load, along with available capacity, can be used in performing generative AI request routing. The API also collects prompt/response data for storage in the prompt/response data store. The API also maintains different priority queues for different access patterns (such as synchronous and asynchronous patterns) and processes the generative AI requests in order of priority. This improves efficiency with which call routing is performed, thus leading to lower computing system capacity needed to service the calls.

The present discussion also proceeds with respect to a prompt/response storage system. The prompt/response storage system stores evaluation data corresponding to the prompt to indicate the effectiveness or performance of the prompt. The prompt/response store also identifies surreptitious prompts and tags them so that they can be used in identifying other surreptitious prompts. The prompt/response store shares prompt libraries to the various development environments and also stores prompts and responses, automatically, in user or tenant data shards to maintain data boundaries and compliance. Thus, the prompts can be reused, tuned, or otherwise accessed in a compliant manner. This significantly simplifies and expedites the developer's experience in developing a generative AI system and reduces memory requirements for separately storing prompts in different places.

It will be noted that the above discussion has described a variety of different systems, components, generators, processors, identifiers, evaluators, and/or logic. It will be appreciated that such systems, components, generators, processors, identifiers, evaluators, and/or logic can be comprised of hardware items (such as processors and associated memory, or other processing components, some of which are described below) that perform the functions associated with those systems, components, generators, processors, identifiers, evaluators, and/or logic. In addition, the systems, components, generators, processors, identifiers, evaluators, and/or logic can be comprised of software that is loaded into a memory and is subsequently executed by a processor or server, or other computing component, as described below. The systems, components, generators, processors, identifiers, evaluators, and/or logic can also be comprised of different combinations of hardware, software, firmware, etc., some examples of which are described below. These are only some examples of different structures that can be used to form the systems, components, generators, processors, identifiers, evaluators, and/or logic described above. Other structures can be used as well.

The present discussion has mentioned processors and servers. In one examples, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted that the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 11 is a block diagram of architecture 100, shown in FIG. 1, except that its elements are disposed in a cloud computing architecture 590. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 11, some items are similar to those shown in FIG. 1 and they are similarly numbered. FIG. 11 specifically shows that aggregation layer 112, development platform 114, API 106, prompt response storage system 116, and layers 104 and 107 can be located in cloud 592 (which can be public, private, or a combination where portions are public while others are private). Therefore, user 594 uses a user device 596 to access those systems through cloud 592.

It is also contemplated that some elements of architecture 100 can be disposed in cloud 592 while others are not. By way of example, some items can be disposed outside of cloud 592, and accessed through cloud 592. Regardless of where the items are located, the items can be accessed directly by device 596, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
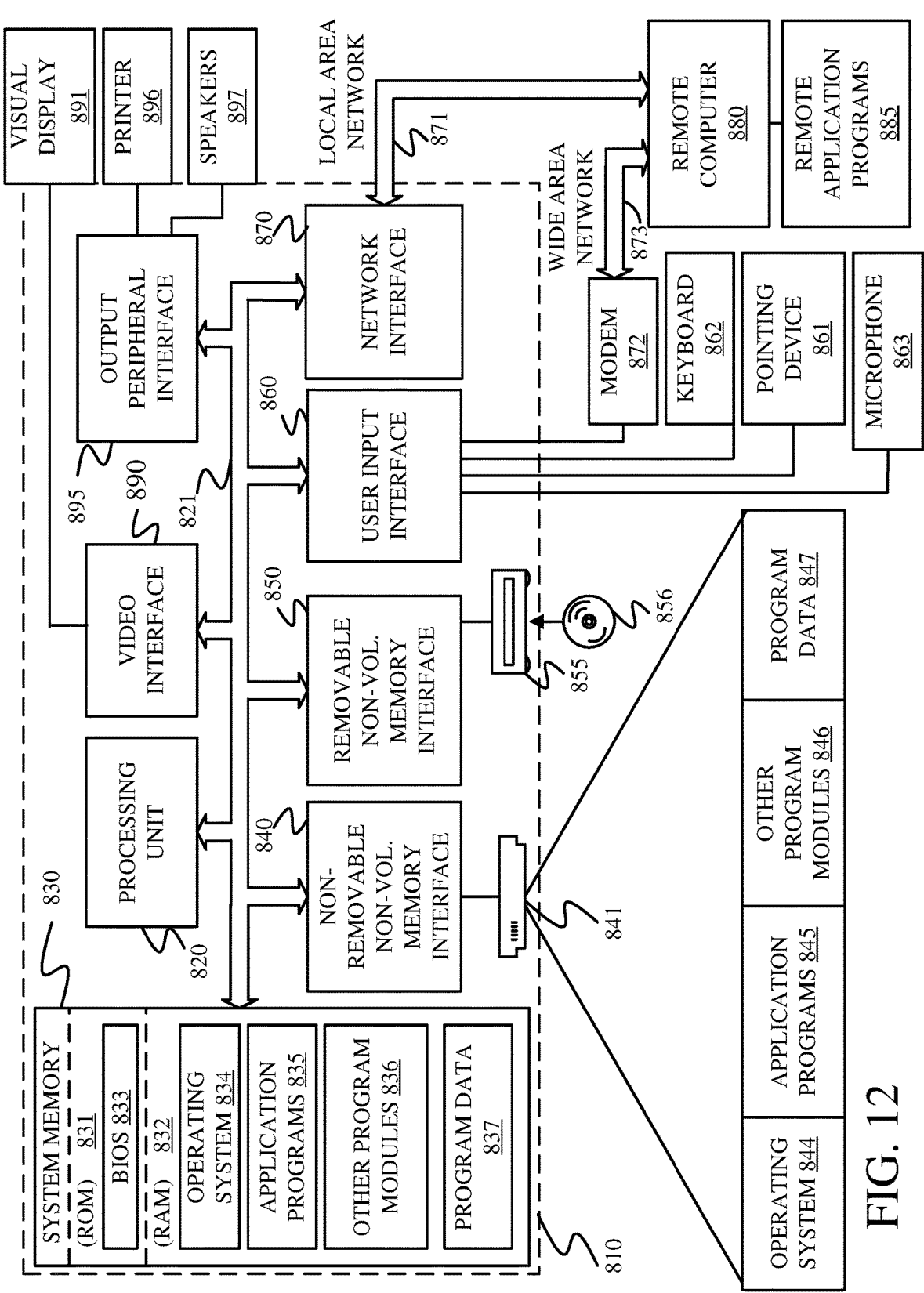
FIG. 12 is a block diagram showing one example of a computing environment that can be used and the architectures illustrated in previous figures.

FIG. 12 is one example of a computing environment in which architecture 100, or parts of it, (for example) can be deployed. With reference to FIG. 12, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive

841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
receiving, at a generative artificial intelligence (AI) application programming interface (API), from a calling system, a generative AI request;
determining a generative AI model type configured to execute the generative AI request;
determining a subset of generative AI models from a plurality of different generative AI models that correspond to the generative AI model type:
identifying dedicated graphics processing units (GPUs) associated with the subset of generative AI models, individual dedicated GPUs being dedicated to individual generative AI models prior to receiving the generative AI request;
estimating a plurality of estimated generative loads for executing the generative AI request by individual dedicated GPUs, estimating the plurality of estimated generative loads being based at least in part on a hardware characteristic of the dedicated GPUs;
routing the generative AI request to a selected generative AI model, of the subset of generative AI models, based on the plurality of estimated generative loads;
receiving a response from the selected generative AI model; and
returning the response to the calling system.

2. The computer implemented method of claim 1 wherein the generative AI request includes a prompt with a linguistic request portion and wherein processing the generative AI request further comprises:
processing the linguistic request portion of the prompt to generate a set of tokens based on words in the linguistic request portion; and
identifying a plurality of calls to be made to the generative AI model based on the set of tokens.

3. The computer implemented method of claim 1 wherein receiving a generative AI request comprises:
receiving a plurality of different generative AI requests from a plurality of different calling systems.

4. The computer implemented method of claim 3 and further comprising:

assigning a request priority to each of the plurality of generative AI requests; and
routing the plurality of generative AI requests based on the request priority assigned to each of the plurality of generative AI requests.

5. The computer implemented method of claim 4 wherein assigning a request priority comprises:
evaluating a set of priority criteria to obtain a priority evaluation result for a selected generative AI request, of the plurality of generative AI requests; and
assigning the request priority to the selected generative AI request based on the priority evaluation result.

6. The computer implemented method of claim 5 wherein assigning a request priority comprises:
identifying an access pattern corresponding to the selected generative AI request;
identifying a request priority queue, of a plurality of different request priority queues, based on the identified access pattern corresponding to the selected generative AI request; and
generating an entry in the identified request priority queue based on the request priority assigned to the selected generative AI request.

7. The computer implemented method of claim 6 wherein identifying an access pattern comprises:
identifying whether the selected generative AI request is a synchronous request or an asynchronous request.

8. The computer implemented method of claim 7 wherein identifying the request priority queue comprises:
identifying the request priority queue as a synchronous request priority queue that stores entries corresponding to synchronous generative AI requests when the selected generative AI request is a synchronous request; and
identifying the request priority queue as an asynchronous request priority queue that stores entries corresponding to asynchronous generative AI requests when the selected generative AI request is an asynchronous request.

9. The computer implemented method of claim 2 wherein processing the generative AI request further comprises:
processing the prompt to identify data to be extracted and routed to the AI model with the generative AI request.

10. The computer implemented method of claim 9 wherein processing the prompt comprises:
extracting the identified data to obtain extracted data and wherein routing comprises sending the extracted data to the generative AI model.

11. The computer implemented method of claim 10 wherein extracting the identified data comprises at least one of:
extracting context data or extracting augmented data.

12. The computer implemented method of claim 1 wherein the generative AI request includes a prompt and further comprising:
capturing prompt data based on the prompt and response data based on the response; and
sending the prompt data and the response data to a prompt/response data store.

13. The computer implemented method of claim 1, wherein the estimated generative load comprises estimated computing system resources required to generate a response to the generative AI request.

14. The computer implemented method of claim 1, wherein the estimated generative load comprises an estimated amount of time for the dedicated GPUs to generate a response to the generative AI request.

15. The computer implemented method of claim 1, wherein the estimated generative load comprises an estimated amount of memory needed to generate a response to the generative AI request.

16. A computing system, comprising:

a generative artificial intelligence (AI) application programming interface (API) that receives a generative AI request from a calling system;

a prompt processor configured to:

determine a generative AI model type configured to execute the generative AI request;

determine a subset of generative AI models from a plurality of different generative AI models that correspond to the generative AI model type:

identify dedicated graphics processing units (GPUs) associated with the subset of generative AI models, individual dedicated GPUs being dedicated to individual generative AI models prior to receiving the generative AI request; and estimate a plurality of estimated generative loads for executing the generative AI request by individual dedicated GPUs, estimating the plurality of estimated generative loads being based at least in part on a hardware characteristic of the dedicated GPUs;

a generative AI request routing system configured to route the generative AI request to a selected generative AI model, of the subset of different generative AI models, based on the plurality of estimated generative loads; and a response processor configured to receive a response from the selected generative AI model and returns the response to the calling system.

17. The computing system of claim 16 wherein the generative AI API receives a plurality of different generative AI requests from a plurality of different calling and further comprising:

a request priority processor configured to assign a request priority to each of the plurality of generative AI requests and wherein the generative AI request routing system routes the plurality of generative AI requests based on the request priority assigned to each of the plurality of generative AI requests.

18. The computing system of claim 17 wherein the request priority processor comprises:

an access pattern identifier that identifies an access pattern corresponding to a selected generative AI request.

19. A computer system, comprising:

at least one processor;

a memory storing computer executable instructions which, when executed by the at least one processor, cause the at least one processor to perform steps comprising:

receiving a generative AI request;

processing the generative AI request, at a generative AI processing layer, by:

determining a generative AI model type configured to execute the generative AI request;

determining a subset of generative AI models from a plurality of different generative AI models that correspond to the generative AI model type;

identifying dedicated graphics processing units (GPUs) associated with the subset of generative AI models, individual dedicated GPUs being dedicated to individual generative AI models prior to receiving the generative AI request;

estimating a plurality of estimated generative loads for executing the generative AI request by individual dedicated GPUs, estimating the plurality of estimated generative loads being based at least in part on a hardware characteristic of the dedicated GPUs;

routing the generative AI request from the generative AI processing layer to the selected generative AI model.

20. The computer system of claim 19 wherein processing the generative AI request comprises identifying an estimated length of a requested AI generation, and wherein routing comprises:

routing the generative AI request from the generative AI processing layer to the selected generative AI model, of the plurality of different types of generative AI models based on the estimated length of the requested AI generation.

* * * * *